(12) United States Patent
Chan et al.

(10) Patent No.: US 8,473,385 B2
(45) Date of Patent: Jun. 25, 2013

(54) FORMAT IN COMPUTER-PROVIDED USER INTERFACE FOR ENTERING TRANSACTION FEE STRUCTURE

(75) Inventors: David Chan, Singapore (SG); Samuel Lim, Singapore (SG); Rama Sridhar, Singapore (SG)

(73) Assignee: MasterCard International Incorporated, Purchase, NY (US)

( * ) Notice: Subject to any disclaimer, the term of this patent is extended or adjusted under 35 U.S.C. 154(b) by 1114 days.

(21) Appl. No.: 11/951,058

(22) Filed: Dec. 5, 2007

(65) Prior Publication Data

US 2008/0249912 A1    Oct. 9, 2008

Related U.S. Application Data

(60) Provisional application No. 60/910,550, filed on Apr. 6, 2007.

(51) Int. Cl.
*G06Q 40/00* (2006.01)
*G06Q 40/02* (2012.01)
*G06Q 40/04* (2012.01)
*G06Q 40/06* (2012.01)

(52) U.S. Cl.
USPC .......................................................... 705/35

(58) Field of Classification Search
CPC .......... G06Q 40/00; G06Q 40/02; G06Q 40/04; G06Q 40/06
USPC .......................................................... 705/35
See application file for complete search history.

(56) References Cited

U.S. PATENT DOCUMENTS

| | | | |
|---|---|---|---|
| 6,300,948 B1 * | 10/2001 | Geller et al. | 715/866 |
| 2007/0156977 A1 * | 7/2007 | Ritter et al. | 711/156 |

* cited by examiner

*Primary Examiner* — Daniel Felten
*Assistant Examiner* — Clifford Madamba
(74) *Attorney, Agent, or Firm* — Buckley, Maschoff & Talwalkar LLC

(57) ABSTRACT

Data entry fields for entering a transaction fee structure are laid out in a grid of rows and in three or four columns. Data entered in a field in the second column defines the end point amount for a tier of transactions and is automatically populated into the field in the first column in the next row to define the starting point for the next tier of transactions. Data entered into a field in the third or fourth column defines a fee level for the tier of transactions defined by the amounts in the fields in the same row and in the first and second columns.

21 Claims, 49 Drawing Sheets

FORMAT IN COMPUTER-PROVIDED USER INTERFACE FOR ENTERING TRANSACTION FEE STRUCTURE

CROSS-REFERENCE TO RELATED APPLICATION

This application claims the benefit of provisional patent application Ser. No. 60/910,550, filed Apr. 6, 2007, which application is incorporated herein by reference.

BACKGROUND

Embodiments disclosed herein relate to remittance systems. In particular, some embodiments relate to methods, apparatus, systems, means and computer program products for implementing a remittance system on the basis of an international payment card system.

Many individuals regularly send money to family or friends across international borders. The total annual volume of international person-to-person remittances is measured in the hundreds of billions of U.S. dollars (including transactions that involve U.S. dollars and transactions that do not involve U.S. dollars) and is increasing from year to year.

Formal commercial remittance channels are generally labor-intensive and expensive to use. Informal channels for remittances are also labor-intensive and may not provide adequate protection for the funds remitted. Many of the people who make or receive international remittances are not wealthy and can ill-afford the costs and risks presented by conventional remittance channels.

More generally, senders and recipients of remittances frequently find conventional remittance channels to be time-consuming and inconvenient. It is not unusual for the sender to be required to bring cash to a store operated by a remittance services provider (RSP). Accordingly, the sender is constrained to accommodate himself or herself to the store's operating hours, must carry cash on his or her person, and may have to wait in line or otherwise experience poor service at the RSP's store. The recipient also may be required to pick up the remitted funds at an RSP's store, thereby possibly suffering the same disadvantages and inconveniences that the sender was subject to.

International remittances also raise issues related to governmental security and anti-crime interests. In many countries, regulations are in place with respect to international transfers of funds, to aid in efforts to combat funding of terrorist groups and organized crime. There are also international initiatives in these areas. These types of regulations are generally referred to as "anti-money laundering" (AML) provisions, and typically require that financial institutions and RSPs "know your customer" (KYC). Compliance with KYC and AML regulations may place significant cost and administrative burdens on formal international remittance channels. Of course, these costs are passed on to the users of the remittance channels.

In U.S. patent application Ser. No. 11/836,984 (which has a common inventor herewith, and which is incorporated herein by reference), an international remittance system was proposed that is based on an international payment card system such as that operated by MasterCard International Inc. (the assignee hereof) and its member financial institutions. Aspects of the present disclosure extend the benefits of such a system to remittance recipients who do not have payment card accounts.

The present disclosure, in other aspects, addresses issues that may arise related to encouraging participation by payment card account issuing financial institutions in an international remittance system. In particular, the present disclosure proposes web-based software tools that make it convenient for participating financial institutions to perform administrative tasks involved in implementing policy decisions related to participation in such a remittance system.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIGS. 5-9 are screen displays that may be provided by the server computer of FIG. 3 to aid in administrative set-up procedures performed by a financial institution which participates in an international remittance system.

FIGS. 11-14 are screen displays that may be provided by the server computer of FIG. 3 in conjunction with the procedure illustrated by FIG. 10.

FIGS. 16-24 are screen displays that may be provided by the server computer of FIG. 3 in conjunction with the procedure illustrated by FIG. 15.

FIGS. 25-30 are screen displays that may be provided by one or more computers included in the system of FIG. 2 in connection with other administrative aspects of an international remittance system.

FIGS. 31-41 are screen displays presented in the system of FIGS. 1 and/or 2 to a customer who wishes to make remittances using the international remittance system.

DETAILED DESCRIPTION

In general, and for the purpose of introducing concepts of embodiments of the present invention, an international remittance system is based on a payment card system such as that operated by MasterCard International Inc., the assignee hereof. Remittances are transferred and cleared from senders' payment card accounts to recipients' payment card accounts or to recipients' accounts that are not payment card accounts. Financial institutions are the issuers of the payment card accounts and handle compliance with KYC/AML regulations.

In some embodiments, web-based tools provide a convenient vehicle for participating financial institutions to implement policy decisions concerning, e.g., the levels of service fees and/or foreign exchange fees to be charged in connection with remittances.

Remittance systems such as those described herein may leverage existing payment systems to provide previously unavailable efficiencies, cost-effectiveness and convenience, while also facilitating regulatory compliance by participating financial institutions (FIs).

Figure 1:
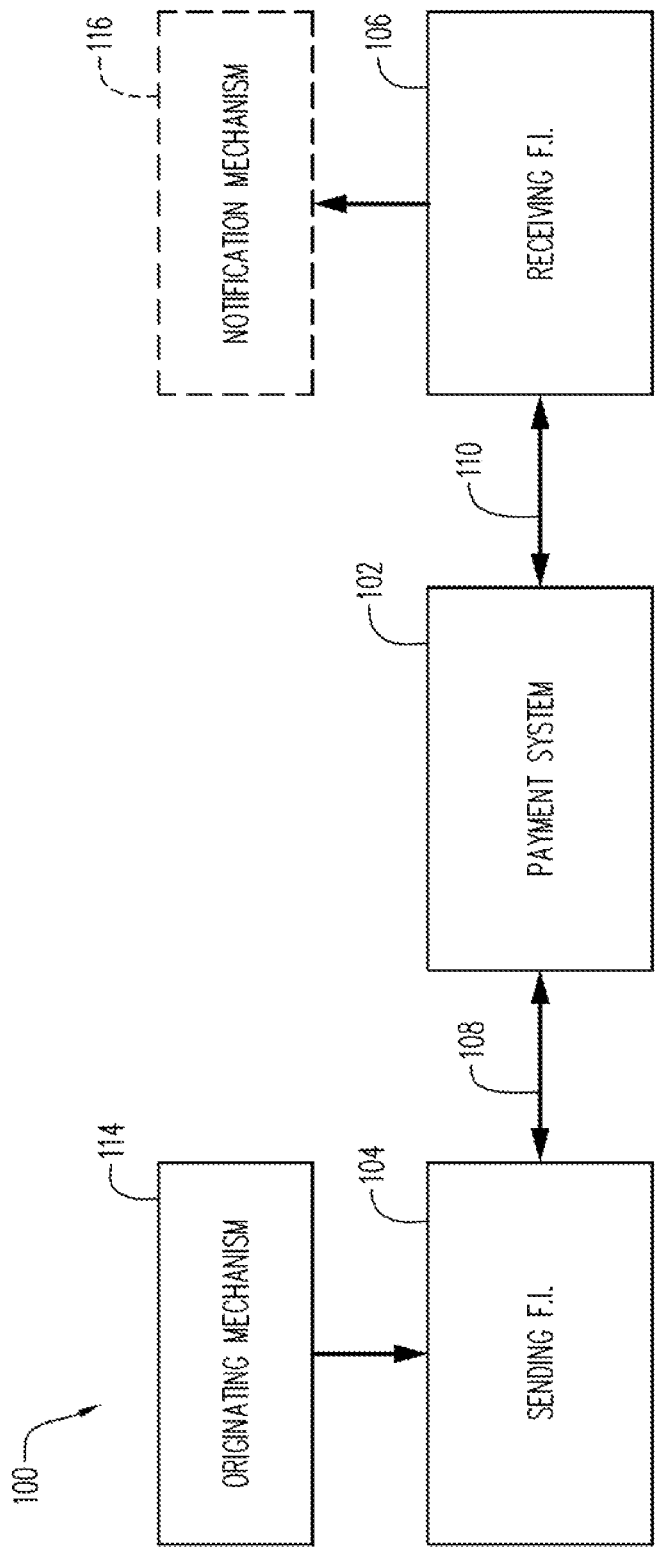
FIG. 1 is a block diagram that illustrates an international remittance system provided according to some aspects of the present invention.

FIG. 1 is a block diagram that illustrates an international remittance system 100 provided according to some aspects of the present invention.

At the heart of the remittance system 100 is a payment system 102. As will be seen, the payment system 102 operates to route and clear funds transfers from the payment card accounts of senders to the payment card accounts or other accounts of recipients. One example of a suitable payment system is the Banknet system, which is well-known to those who are skilled in the art, and which is operated by the assignee hereof.

A major strength of a payment system such as the Banknet system is that it interlinks numerous financial institutions around the world. In practice the remittance system 100 may include many financial institutions that act as issuers of payment card accounts, but for purposes of illustration only two such FIs are shown in FIG. 1, namely the financial institution (sending FI 104) that issued the payment card account of the sender of a remittance, and the financial institution (receiving FI 106) that issued the payment card account of the recipient of the remittance. (As discussed below in connection with FIG. 42, in an alternative embodiment, at least some of the recipients' accounts need not be payment card accounts.) As indicated respectively at 108 and 110, the sending FI 104 and the receiving FI 106 are both connected by suitable data communication paths to the payment system 102. It may be assumed that the receiving FI 106 is located in a different country from FI 104 so that any remittance transmitted between the two FIs 104, 106 is an international remittance.

It may also be assumed that the FIs 104, 106, and the other FIs included in the remittance system 100 but not depicted in the drawings, are banks or other organizations that are subject to regulation to assure compliance with KYC and AML requirements. It may also be assumed that the FIs have internal procedures in place to comply with KYC and AML requirements. Consequently, upon or prior to opening a payment card account for a customer, each FI gathers information about the customer, such as the customer's full name, and residential address. Customary procedures may also call for the FI to obtain documentary proof of the customer information. The documentary proof may be a driver's license, a passport, an identity card, etc. To demonstrate compliance with the documentation procedures, the FI may also keep an image of the document(s) used to establish the customer's identity and address.

Continuing with the concept that FIG. 1 shows components of the remittance system 100 with respect to a single remittance transaction, block 114 represents a mechanism by which the sender initiates a funds transfer. The mechanism 114, from which the funds transfer originates, may come in a number of different forms, such as the sender's mobile telephone, an automatic teller machine (ATM), or a personal computer or other web-browsing device (from which the sender may access a website maintained by or on behalf of the sending FI 104). As another alternative, the sender may visit a bank branch to initiate the funds transfer, and may speak with an employee of the sending FI 104. In response to the sender's request, the sending FI employee may operate a personal computer or terminal to launch the funds transfer.

Also shown in FIG. 1 (in phantom) is a mechanism 116 that may be utilized by the receiving FI 106 to notify that recipient that the funds transfer has taken place. The notification mechanism may be the recipient's mobile telephone, to which the receiving FI may send a text message or automated telephone call. Other possible embodiments of the notification mechanism may include the recipient's home personal computer (by e-mail) or a pager.

Figure 2:
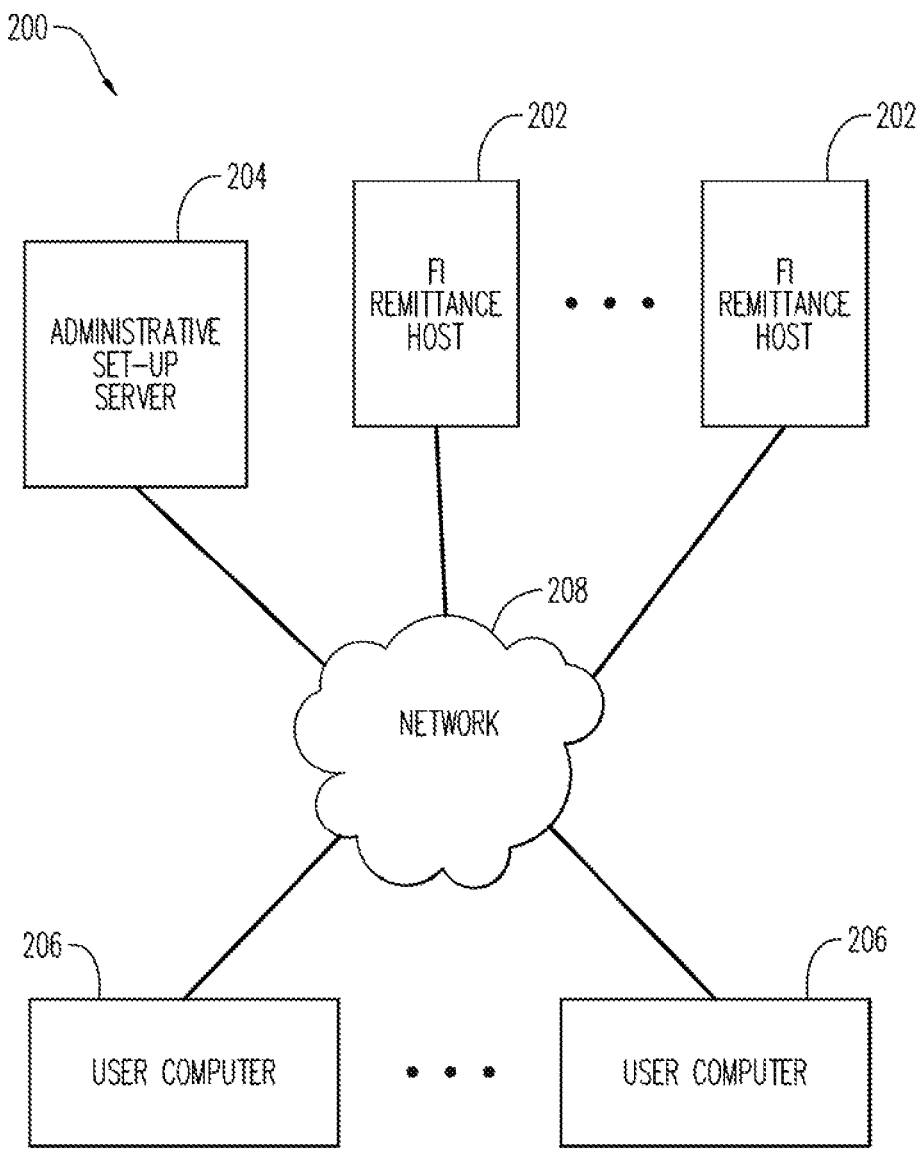
FIG. 2 is a block diagram that illustrates a system of computers operated in connection with administrative aspects and other aspects of the remittance system of FIG. 1 and provided according to other aspects of the present invention.

FIG. 2 is a block diagram that illustrates a system 200 of computers operated in connection with administrative aspects and other aspects of the remittance system 100 of FIG. 1 and provided according to other aspects of the present invention. The main focus of the computer capabilities of FIG. 2 is in connection with set-up and transaction handling at the sending side of an international remittance system such as that illustrated in FIG. 1.

The system 200 may include a number of computers 202 that are operated by or on behalf of financial institutions in connection with the sending of domestic and/or international remittances. Thus, any one or more of the computers 202 may serve the role represented by block 104 (sending FI) in FIG. 1. The number of computers 202 may be large, in that at least one such computer may be operated by or on behalf of each financial institution that participates as a sending FI in a remittance system.

In addition, the system 200 may include a server computer 204 that provides one or more web-based tools for use by sending financial institutions in implementing remittance services for the customers of the sending FIs. As will be seen, in some embodiments, the tools provided by the server computer 204 may aid in set-up operations for service fees and in other administrative functions which a sending FI may need to engagein.

Still further, the system 200 may include a number of user computers 206. As will be seen, the user computers may be operated by individual customers who wish to make remittances and may be used by the individuals to access remittance services offered by sending FIs. In general, each individual customer may have, or wish to establish, a banking relationship with one of the sending FIs referred to above.

Another class of user computers 206 (not separately indicated) may be operated by administrative personnel who are employed by sending FIs. User computers of this class may be operated to access the server computer 204 and/or for other purposes related to the system 200.

The system 200 may also encompass a data communication network 208. The data communication network 208 may be formed partly or entirely by a public network such as the Internet, and/or may be at least partly constituted by private data communication channels. The data communication network 208 may operate to allow one or more of the other components of the system 200 to communicate with one or more other components of the system 200. For example, data communication over the network 208 may take place between the sending FI computers 202 and the administrative set-up computer 204 and between the user computers 206 and the sending FI computers 202.

Various administrative software tools described below may be hosted at and accessed via the administrative set-up server computer 204 or alternatively may be downloaded from the administrative set-up server computer 204 to one or more of the FI remittance host computers 202 and downloaded from and accessed via the FI remittance host computers 202. Alternatively, administrative settings set-up in the administrative set-up server computer 204 may be downloaded therefrom to an FI remittance host computer 202 to control operation of the FI remittance host computer 202. Terminals and/or personal computers operated by FI personnel may interact with either or both of the FI's respective host computer 202 and the administrative set-up server computer 204. The FI functions and/or set-up functions described herein may be divided in any convenient manner between an FI's host computer 202 and the administrative set-up server computer 204. Moreover the computer 204 may be combined with at least one of the computers 202.

Figure 3:
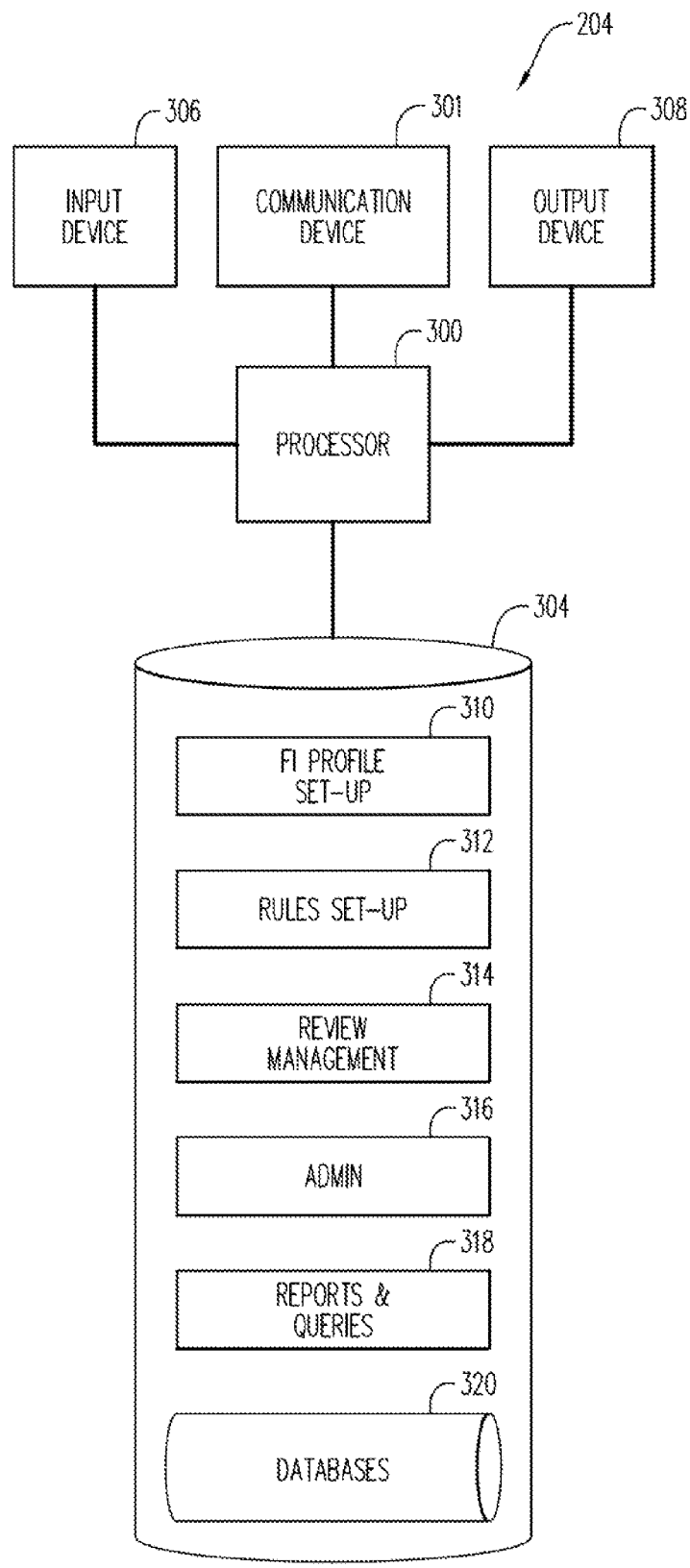
FIG. 3 is a block diagram that illustrates an embodiment of a server computer that may be part of the system of FIG. 2.

FIG. 3 is a block diagram that illustrates an embodiment of the server computer 204.

The server computer 204 may be conventional in its hardware aspects but may be controlled by software to cause it to operate in accordance with aspects of the present invention.

The server computer 204 may include a computer processor 300 operatively coupled to a communication device 301, a storage device 304, an input device 306 and an output device 308.

The computer processor 300 may be constituted by one or more conventional processors. Processor 300 operates to execute processor-executable steps, contained in program instructions described below, so as to control the server computer 204 to provide desired functionality.

Communication device 301 may be used to facilitate communication with, for example, other devices (such as the other computers shown in FIG. 2).

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 304 stores one or more programs for controlling processor 300. The programs comprise program instructions that contain processor-executable process steps of server computer 204, including, in some cases, process steps that constitute processes provided in accordance with principles of the present invention, as described in more detail below.

The programs may include an application/program module 310 that allows FI administrative personnel to set up profiles that are to be stored in the server computer 204 and/or in a respective one of the FI computers 202 in regard to service fees and/or foreign exchange conversion fees to be charged by the FI in question for remittance services. The programs may also include an application/program module 312 that allows FI administrative personnel to establish various rules for remittance transactions. Such rules may include assignment of fee profiles to certain classes of remittance transactions.

Still another application/program module 314 stored on the storage device 304 may aid FI administrative personnel in managing and tracking approval at higher levels of rules proposed by lower level administrative personnel. Further applications/program modules 316 and 318, also stored on the storage device 304, may be useful, respectively, for performing miscellaneous administrative tasks and for implementing data queries or reports regarding remittance activities by an FI. As indicated at 320, the storage device 304 may store one or more databases of information relevant to remittance activities.

In addition to the software programs expressly listed above, the server computer 204 may be programmed with other software, such as one or more operating systems, device drivers, database management programs, programs to enable the server computer 204 to perform web hosting functions, etc.

Figure 4:
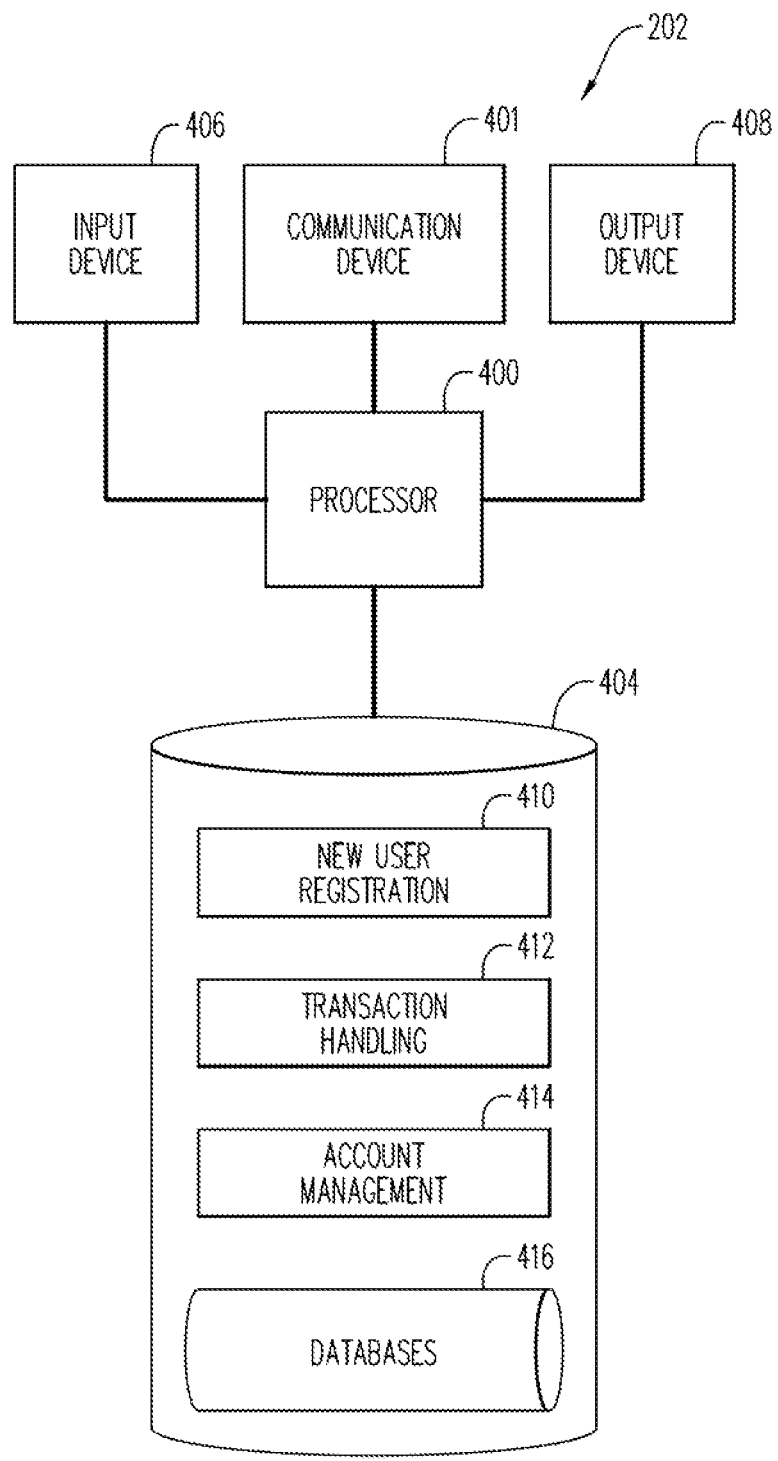
FIG. 4 is a block diagram that illustrates an embodiment of another server computer that may be part of the system of FIG. 2.

FIG. 4 is a block diagram representation of a typical one of the sending FI computers 202 shown in FIG. 2.

In its hardware aspects, the computer 202 may be conventional, and similar to the hardware components described above in connection with the server computer 204. The hardware aspects of the computer 202 will therefore not be further described, except to mention that the computer 202 may include a processor 400 in communication with a communication device 401, a storage device 404, an input device 406, and an output device 408.

The storage device 404 may store an application program 410 that allows prospective senders of remittances to establish user accounts with respect to the FI's remittance services. A further application program 412, also stored on the storage device 404, may operate to handle particular remittance transactions. Still another application program 414, also stored on the storage device 404, may allow for modification and management of user accounts. Further, one or more databases 416 stored on the storage device 404 may contain data relating to remittance transactions, user accounts, etc.

In addition to the software programs expressly listed above, the computer 202 may be programmed with other software, such as one or more operating systems, device drivers, database management programs, programs to enable the computer 202 to perform web hosting functions, etc.

Each of the user computers 206 may be a personal computer or other computing device (including, e.g., a mobile telephone), and may include conventional components such as a CPU, a display, a keyboard and a mouse.

Figure 5:
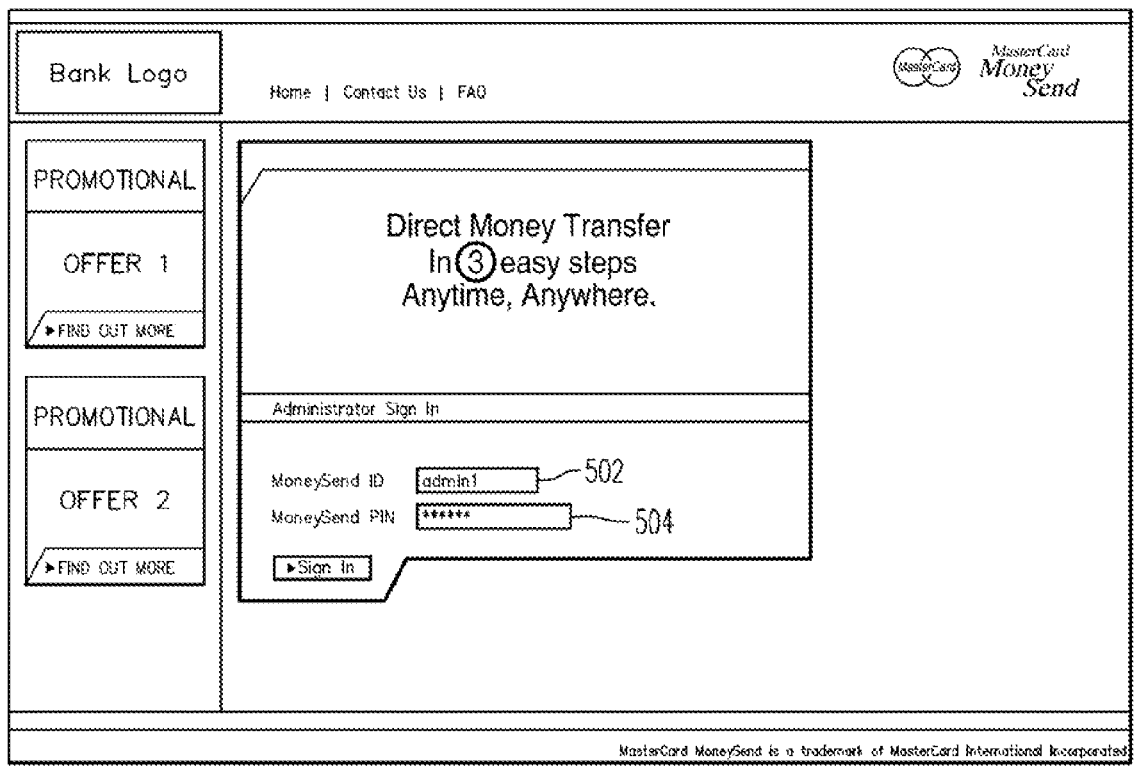
Figure 5A:
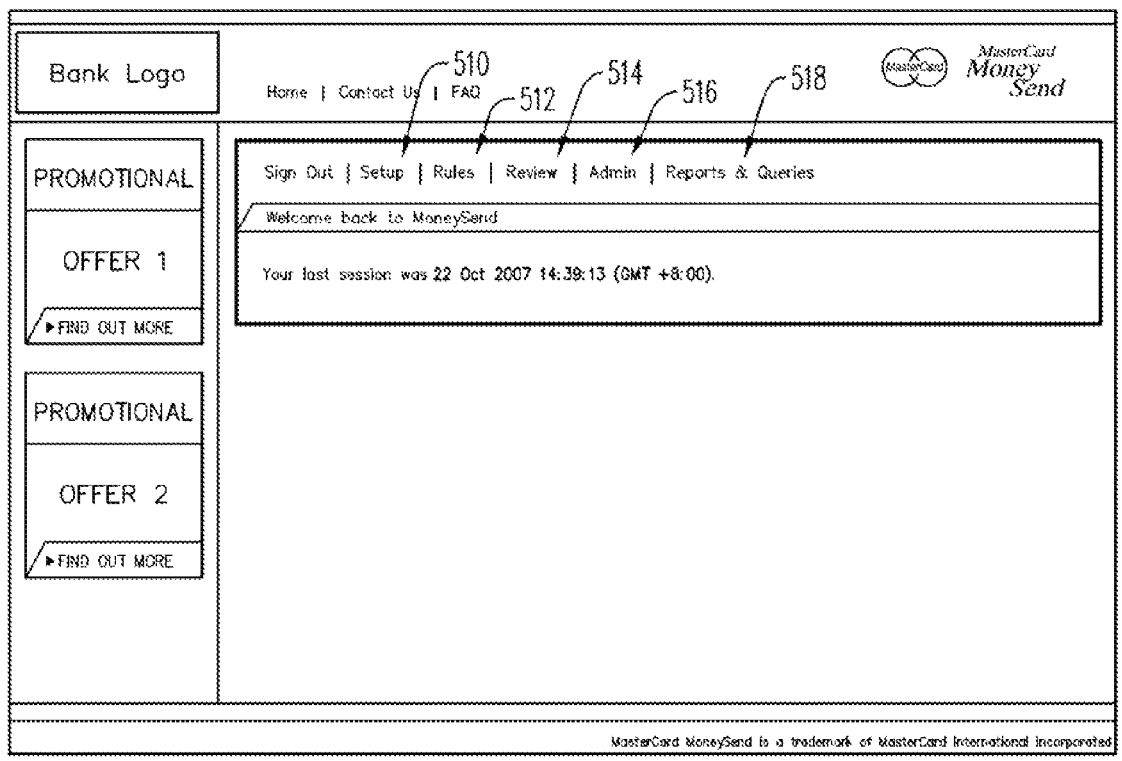

FIG. 5 shows a sign-in screen display that may be accessed by an administrative employee of an FI in connection with the system of FIG. 2. As is also the case with the screen displays shown in FIGS. 5A-9, 11-14 and 16-30, the screen display of FIG. 5 may be downloaded from computer 204 or from one of the computers 202 in FIG. 2, and displayed on the display screen of a personal computer or terminal operated by the administrative employee and in communication with the computer 204 or 202. At the data entry fields 502, 504 in FIG. 5, the administrative employee may enter his/her user ID and PIN, respectively. Upon verification of the user ID and PIN, the screen display shown in FIG. 5A is presented. This screen display is a main menu page, and includes pull down menus 510 ("Setup"), 512 ("Rules"), 514 ("Review"), 516 ("Admin") and 518 ("Reports & Queries").

Figure 6:
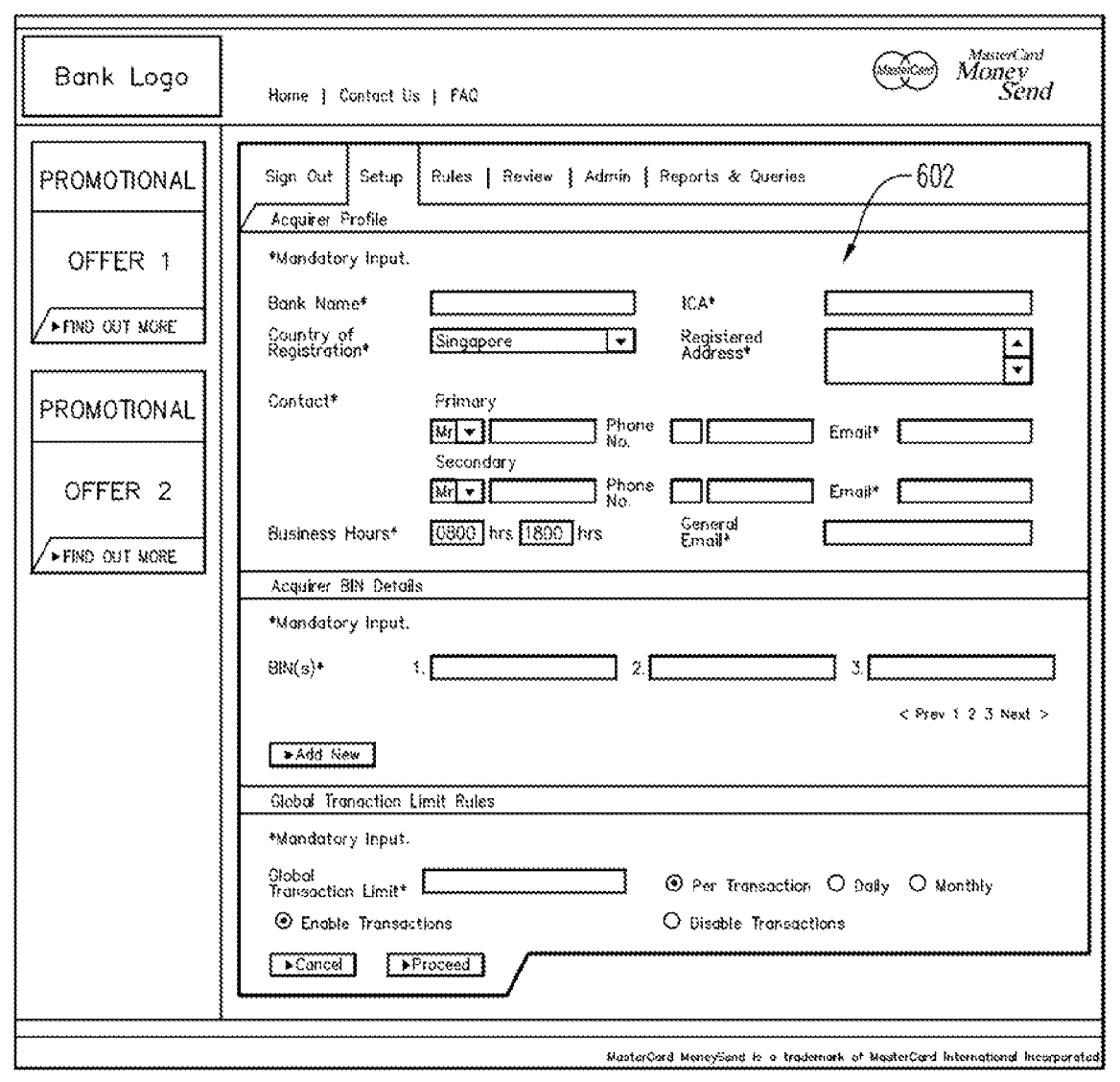

Upon pulling down the menu 510, the user sees the menu options "Acquirer Profile", "Sending Issuers", "Receiving Issuers", "Sending Countries" and "Receiving Countries". If the user selects the "Acquirer Profile" menu option, then the display screen shown in FIG. 6 is provided. The display screen of FIG. 6 is a data entry screen by which the user may define a profile for the sending FI with respect to the payment-card-based remittance system. In the upper region 602 of the data entry screen of FIG. 6, the user may enter information such as the FI's name, country of registration, address, ICA and BIN numbers, and contact information. In a lower region 604 of the data entry screen the user may enter transaction limit(s) that may apply across all transactions initiated in the remittance system by the FI.

Figure 7:
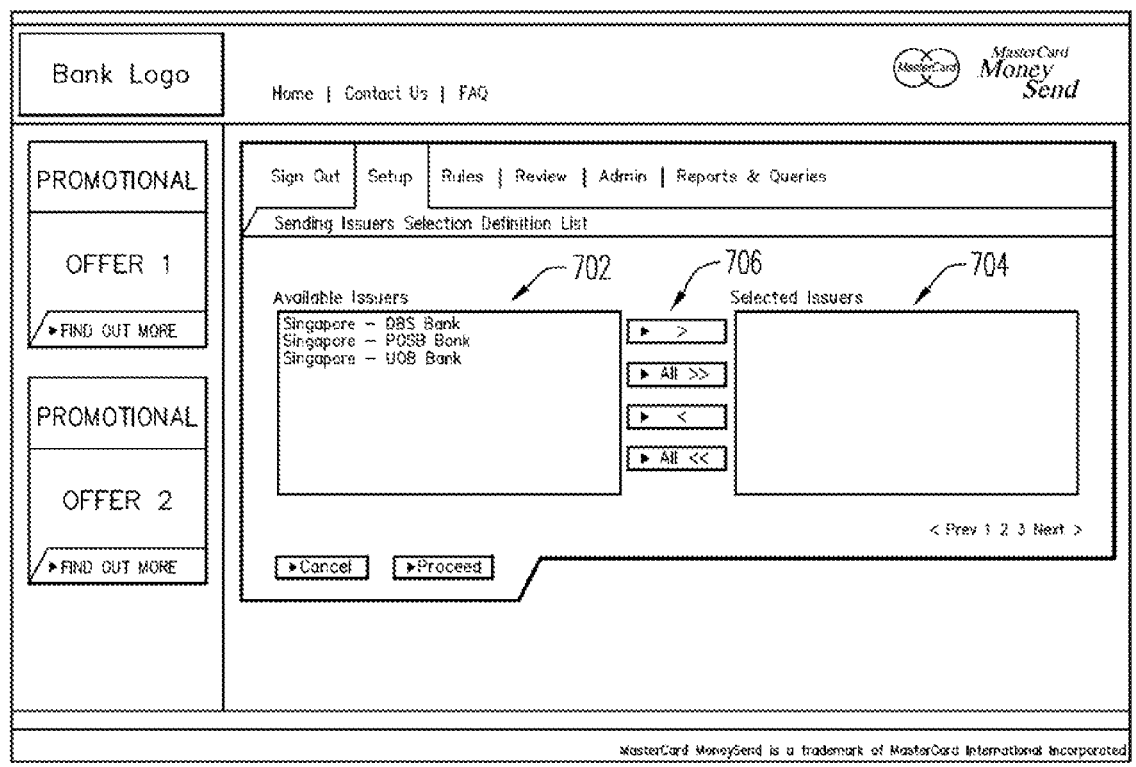

If the user selects the "Sending Issuers" menu option from pull down menu 510, then the screen display shown in FIG. 7 is provided. The screen display of FIG. 7 allows the user to select from among FIs that issue payment card accounts. Selection of one of those issuers in FIG. 7 means that the FI engaged in the setup procedure is enabled to initiate remittance transactions to be funded from payment card accounts issued by the selected issuers. At 702 in FIG. 7 there is a data display field that lists the payment card issuers that are available for selection. Data display field 704 lists (none shown in FIG. 7) issuers that have been selected. Select/de-select buttons 706 may be actuated by the user to add or remove issuers to/from the "selected" list shown in field 704.

If the user selects the "Receiving Issuers" menu option from pull down menu 510, then a screen display similar in format to FIG. 7 is shown. The "Receiving Issuers" screen display (not shown) allows the user to select from among available issuers, where selection of such an issuer enables the FI engaged in the setup procedure to send remittances to the selected issuer.

Figure 8:
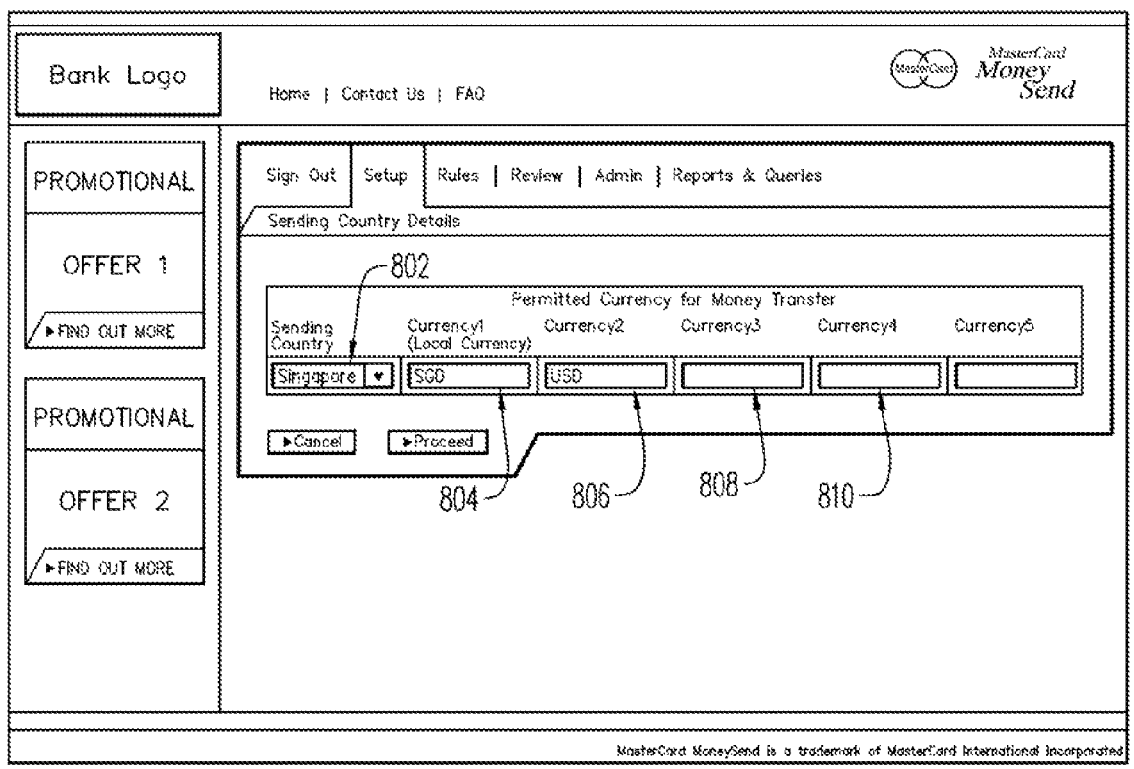

If the user selects the "Sending Countries" menu option from pull down menu 510, then the screen display shown in FIG. 8 is provided. In the screen display of FIG. 8, there may be a pull down menu 802, from which the user may select a country from which the FI may initiate remittance transactions (in some embodiments there may be only one such country). For the selected "sending country" the user may enter, in one or more of the data entry fields 804, 806, 808, 810, codes that represent the currencies that the remittance sender may use to fund remittance transactions.

Figure 9:
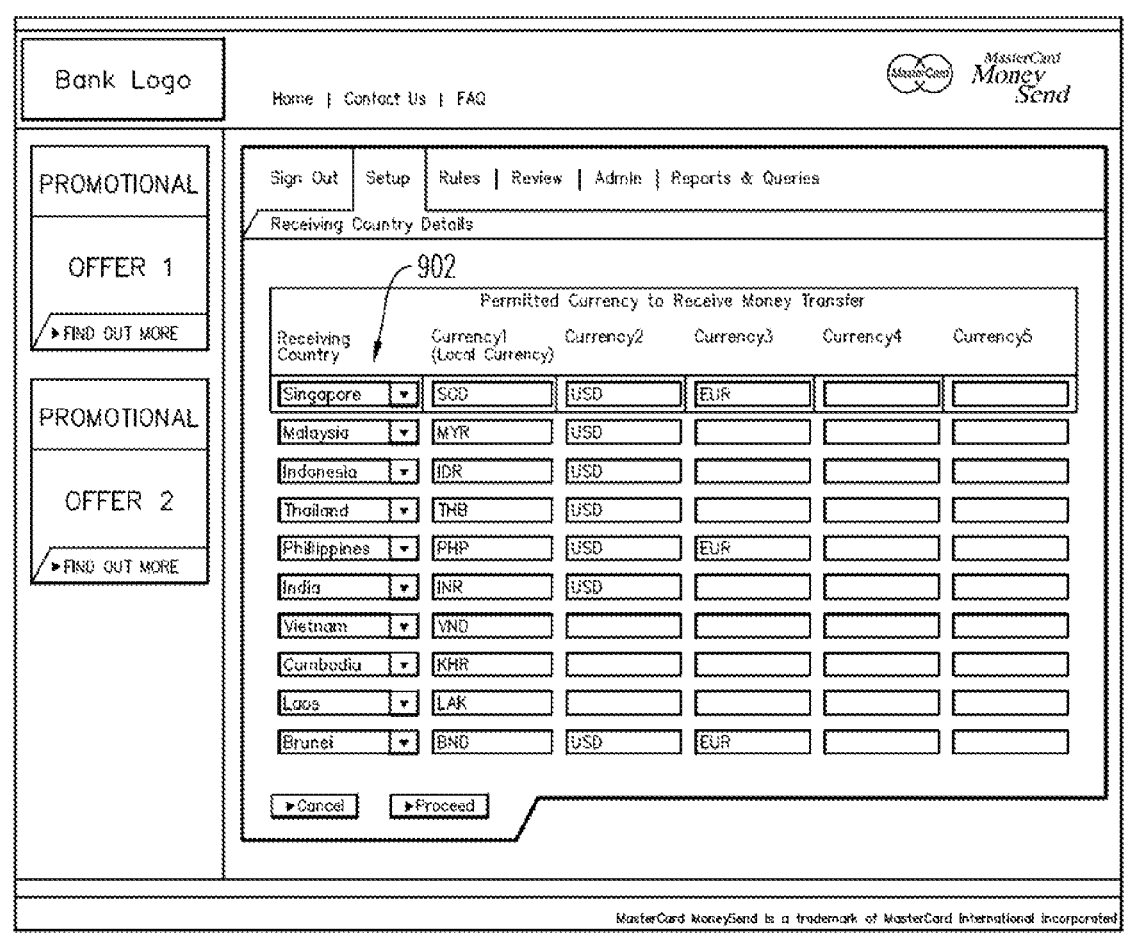

If the user selects the "Receiving Countries" menu option from pull down menu 510, then the screen display shown in FIG. 9 is provided. In the screen display of FIG. 9, there may be a column 902 of pull down menus. Each of the pull down menus in column 902 may be used to select a respective country. Selection of a country from one of the menus in column 902 indicates that the FI is enabled to send remittances to the selected country. For each of the pull down menus in FIG. 9, there is a row of data entry fields in which the user may enter codes to represent currencies in which remittances may be disbursed in the respective selected country.

Upon pulling down the "Rules" menu 512 (FIG. 5A), the user sees the menu options "Service Fees Profile Setup", "Service Fees Profile Assignment", "Forex Markup Profile Setup", "Forex Markup Profile Assignment", "Transaction Limits Profile Setup" and "Transaction Limits Profile Assignment". (As will be appreciated by those who are skilled in the art, "Forex" stands for "foreign exchange", and a "Forex Markup" is a service fee charged for converting one currency to another.)

Figure 10:
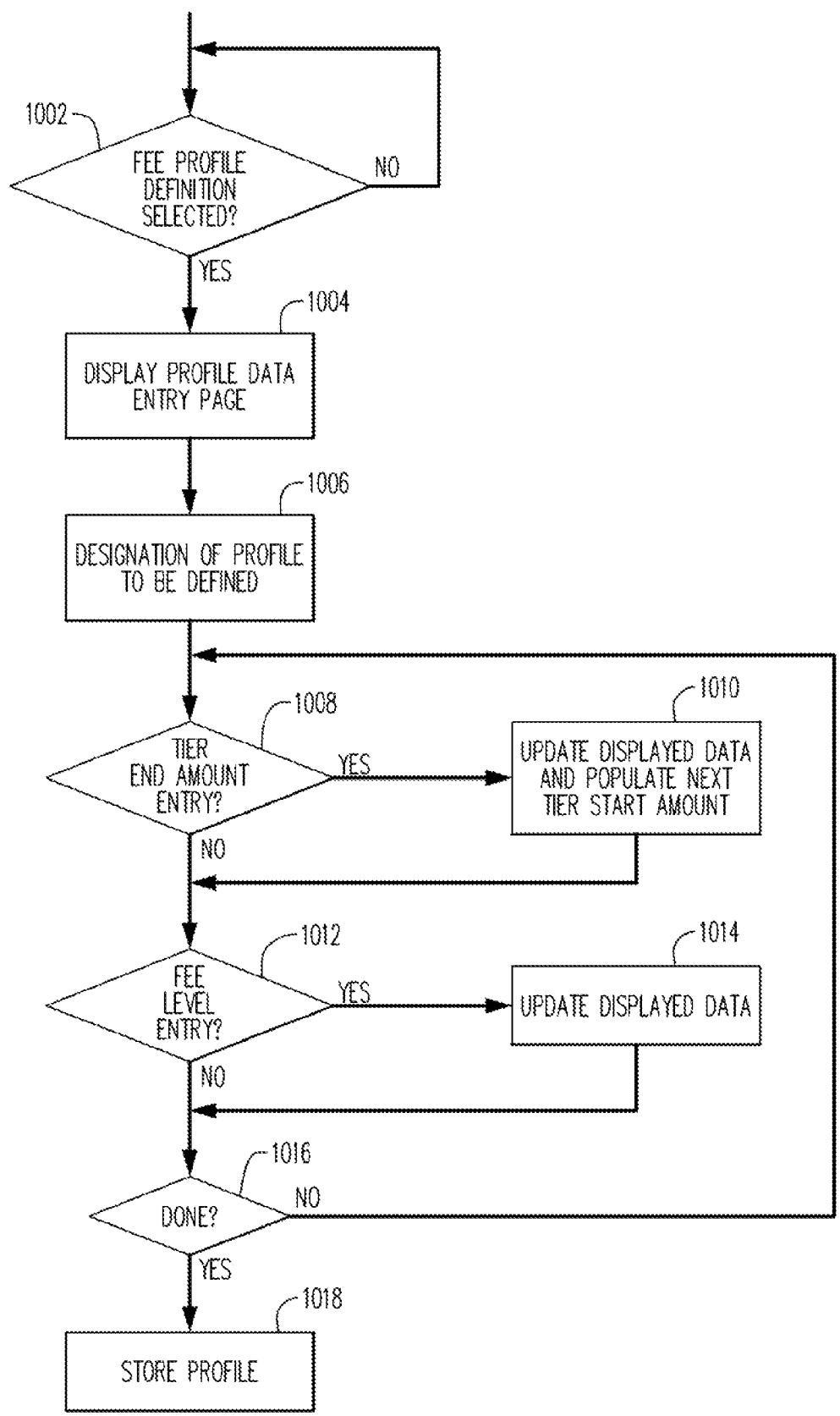
FIG. 10 is a flow chart that illustrates an administrative set-up procedure that may be performed by a financial institution which participates in an international remittance system.

If the user selects the "Service Fees Profile Setup" option from the menu 512, then the process illustrated by the flow chart in FIG. 10 is launched. (This process may be implemented with software on one or both of the server computer 204 or the respective FI's computer 202.)

Figure 11:
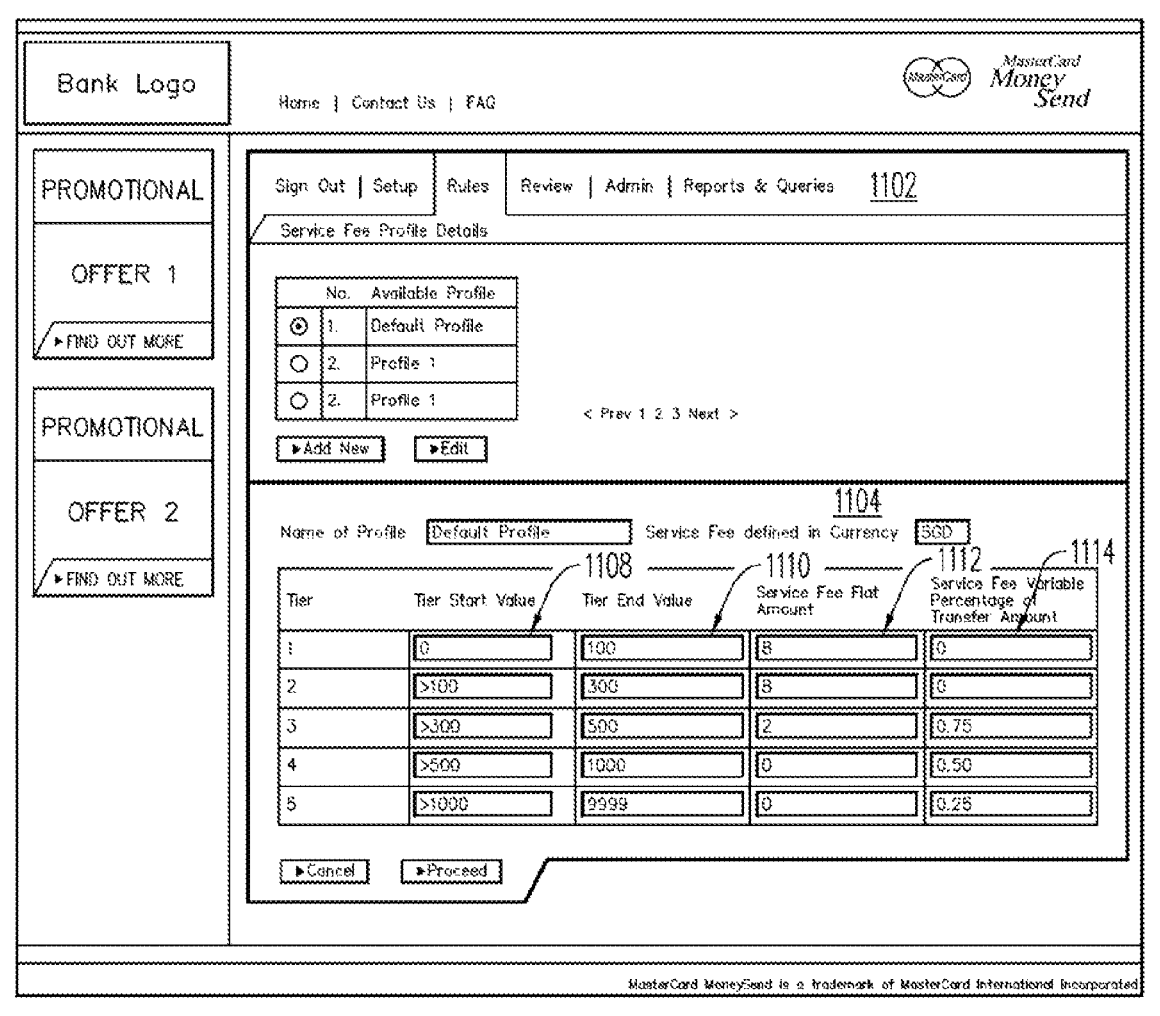

Referring then to FIG. 10, at 1002 in FIG. 10 it is determined whether the user has opted to define a fee profile. If so, then step 1004 follows. At 1004, a data entry page screen display as shown in FIG. 11 is provided. Referring to FIG. 11, the screen display includes an upper portion 1102 and a lower portion 1104.

The upper portion 1102 of the screen display may have several radio buttons, of which the user may select one to select a name or other designation for the fee profile to be defined by entering data in the lower portion 1104. Thus, the lower portion 1104 is for the user to enter data for defining the fee profile designated in the upper portion 11102.

If the user actuates the "Add New" button 1106 in the upper portion 1102, then a data entry field (not shown) is added to the lower portion 1104. This additional data entry field may be used to enter a name or designation for a new profile to be defined with data entry in the lower portion 1104. In this situation, there may also be a pull down menu or the like (not shown) from which to select a code to designate the currency in which the fees are to be denominated.

Designation of the fee profile to be defined, whether by radio button or data entry of a new designation, is indicated at 1006 in FIG. 10.

Referring again to FIG. 11, the lower portion 1104 of the screen display may include four columns of data entry fields, namely, as referenced in FIG. 11, columns 1108, 1110, 1112 and 1114. The data entry fields of the columns 1108, 1110, 1112 and 1114 are also arranged in rows, with each of the rows corresponding to a respective tier of the service fee structure that is to be defined. In each row, the data (if any) displayed in the first column 1108 corresponds to the tier start amount, and the data displayed in the second column 1110 corresponds to the tier end amount. The data in the third column 1112 indicates the amount of service fee applicable to the tier in question, and the data in the fourth column 1114 indicates the percentage service fee applicable to the tier in question, over and above any flat amount fee indicated in the fourth column 1114.

Figure 12:
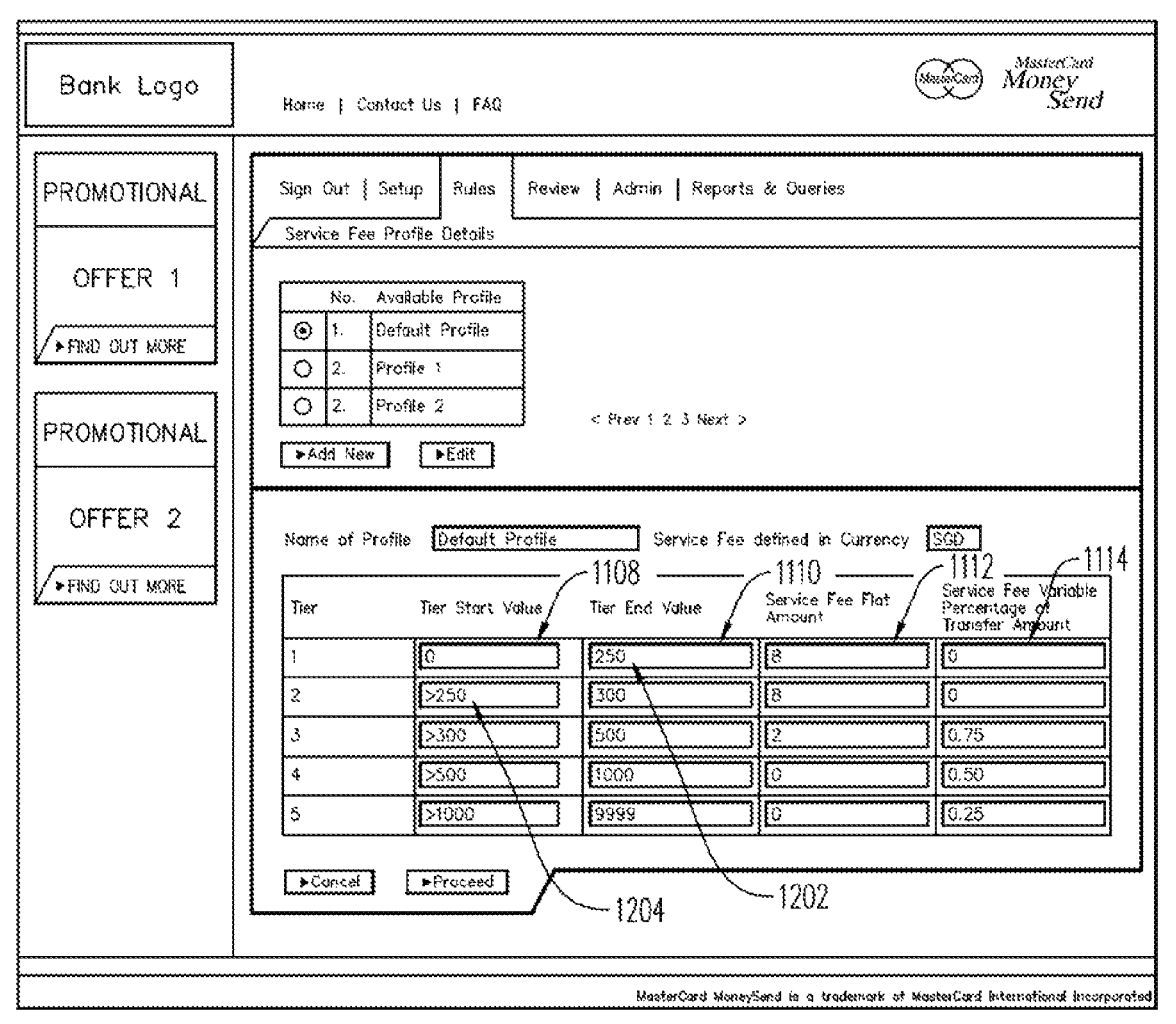

Returning now to FIG. 10, following step 1006 is a decision block 1008. At 1008, it is determined whether the user has entered (e.g., via the keyboard of his/her personal computer/terminal) a numerical amount in a data entry field in the second column 1110. If so, then step 1010 follows decision block 1008. At step 1010, the display is updated in the data entry field to reflect the numerical amount that was entered, and in addition the data entry field in the next row and in the first column 1108 is automatically populated with the amount that was just entered in the second column 1110 in the row above the next row. An example of this is shown in FIG. 12. Specifically (and in comparison to FIG. 11), the data entry field in the first row and in the second column 1110 has received data entry to define the tier end amount for the first tier as 250 Singapore dollars, as indicated at 1202 in FIG. 12. In addition, the data field in the second row and in the first column 1108 has been automatically populated to define the tier start amount for the second row (corresponding to the second tier of the fee structure) as 250 Singapore dollars, as indicated at 1204 in FIG. 12.

Figure 13:
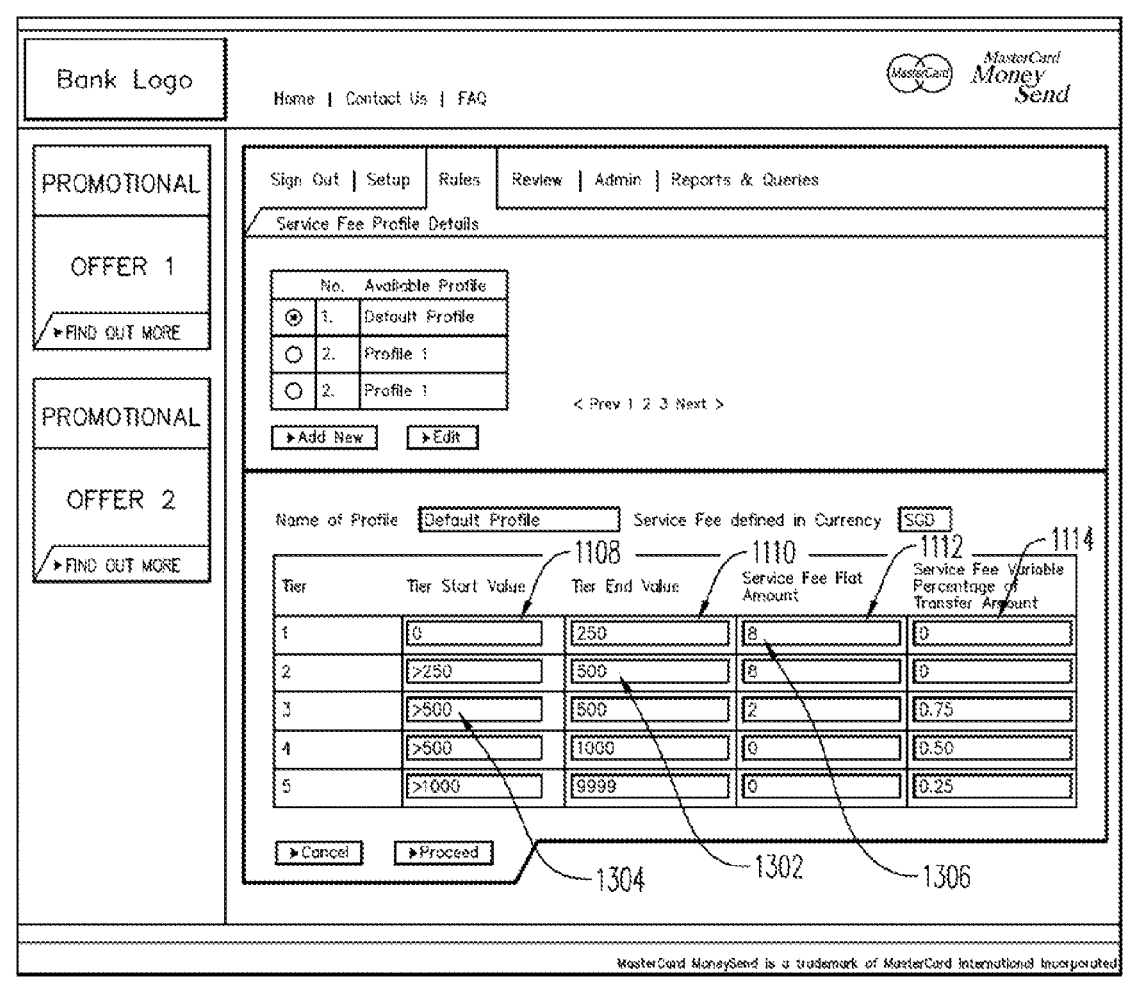

A further tier end amount update/next tier start amount population is illustrated in FIG. 13 (in comparison to FIG. 12). As seen from FIG. 13, the data entry field in the second row and in the second column 1110 has received data entry to define the tier end amount for the second tier as 500 Singapore dollars, as indicated at 1302 in FIG. 13. Also, the data field in the third row and in the first column 1108 has been automatically populated to define the tier start amount for the third row (corresponding to the third tier of the fee structure) as 500 Singapore dollars, as indicated at 1304 in FIG. 13.

Figure 14:
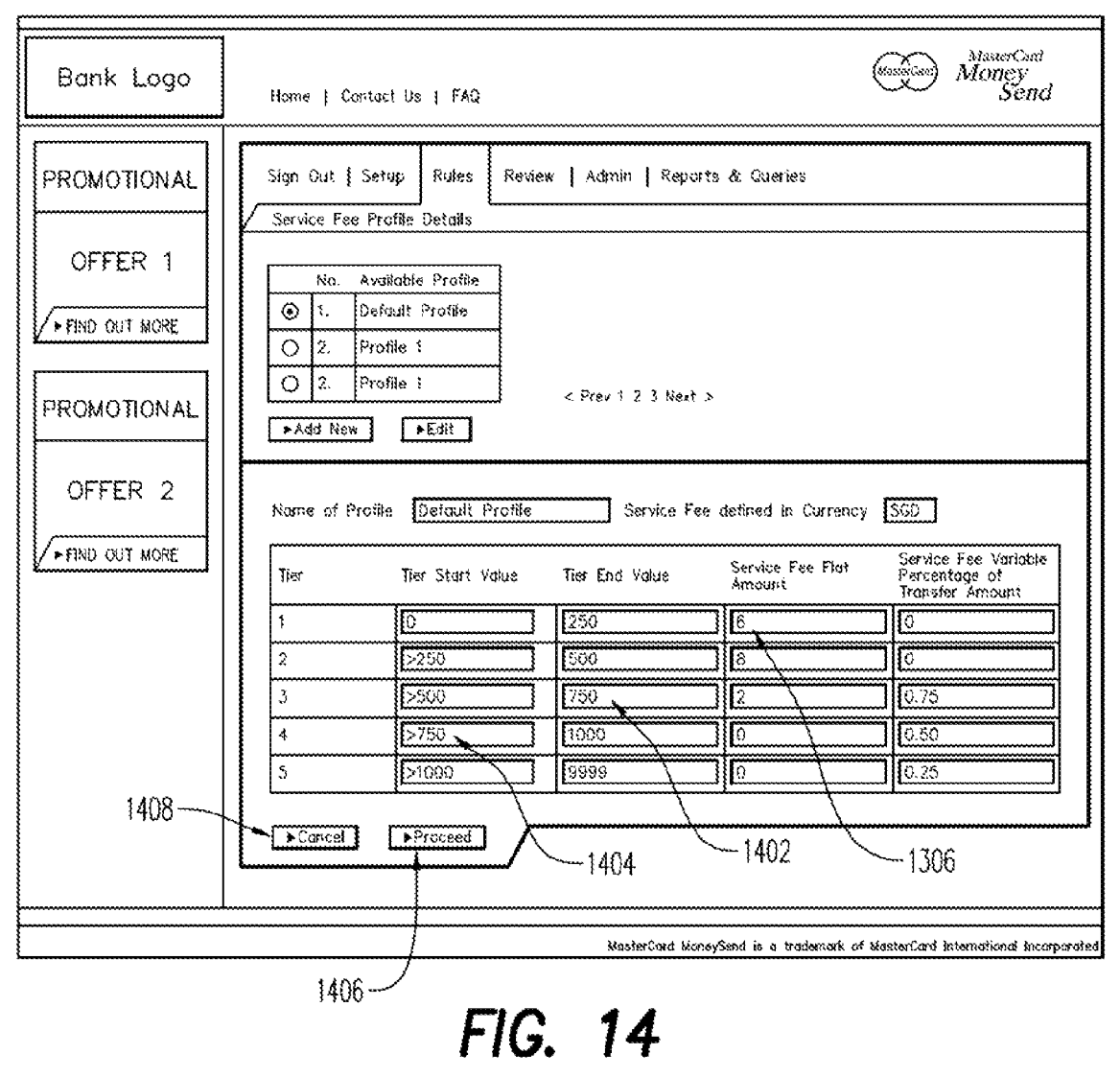

A data entry update for the third tier end amount and automatic population for the fourth tier start amount data field are illustrated respectively at 1402 and 1404 in FIG. 14.

If no tier end amount data entry occurs at 1008, then another decision block 1012 follows decision block 1008. (Alternatively, if a tier end amount data entry did occur at 1008, then decision block 1012 follows step 1010.) At decision block 1012, it is determined whether the user has entered (e.g., via the keyboard of his/her personal computer/terminal) a numerical amount in a data entry field in the third column 1112. If so, then step 1014 follows decision block 1012. At step 1014, the data entry field in question is updated to reflect the data entry, and the corresponding currency amount is assigned as a flat amount service fee to the tier defined by the tier start amount and the tier end amounts indicated in the same row (in the first column 1108 and the second column 1110, respectively). A change/update to the service fee amount for the first tier of the fee structure is indicated by comparing data field 1306 as seen in FIG. 13 with data field 1306 as seen in FIG. 14. Similar changes may of course be made in other rows in the third column 1112 and/or to add or change a percentage based service fee by data entry in the fourth column 1114.

If no fee level data entry occurs at 1012, then another decision block 1016 follows decision block 1012. (Alternatively, if a fee level data entry did occur at 1012, then decision block 1016 follows step 1014.) At decision block 1016, it is determined whether the user has indicated that he/she has completed entering or editing the designated profile. The user may indicate that he/she has completed entering or editing the profile by actuating the "Proceed" button (reference numeral 1406 in FIG. 14). If the user so indicates, a positive determination is made at decision block 1016, and step 1018 then follows decision block 1016. At step 1018, the service fee profile defined by the data entered at 1008, 1012 is stored, for future assignment to certain classes of remittance transactions, as will be described below.

If a negative determination is made at decision block 1016 (i.e., if the user has not indicated that he/she has completed data entry for the fee profile), then the process of FIG. 10 loops back to decision block 1008 and decision block 1012, to allow for multiple iterations of entering tier end amounts and fee level amounts.

Although not expressly indicated in FIG. 10, the user may also escape from the process of FIG. 10, without causing the entered data to be stored, by actuating the "Cancel" button 1408 shown in FIG. 14.

Figure 15:
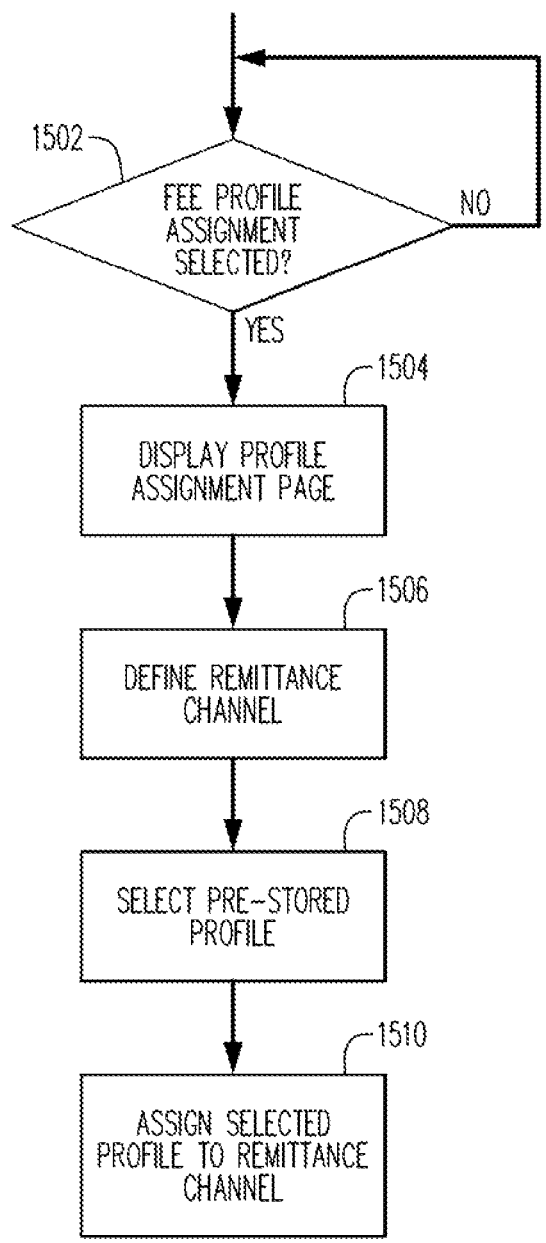
FIG. 15 is a flow chart that illustrates another administrative set-up procedure that may be performed by a financial institution which participates in an international remittance system.

Considering again the "Rules" menu 512 (FIG. 5A), if the user selects the "Service Fees Profile Assignment" option from the menu 512, then the process illustrated by the flow chart in FIG. 15 is launched. (This process may be implemented with software on one or both of the server computer 204 or the respective FI's computer 202.)

Figure 16:
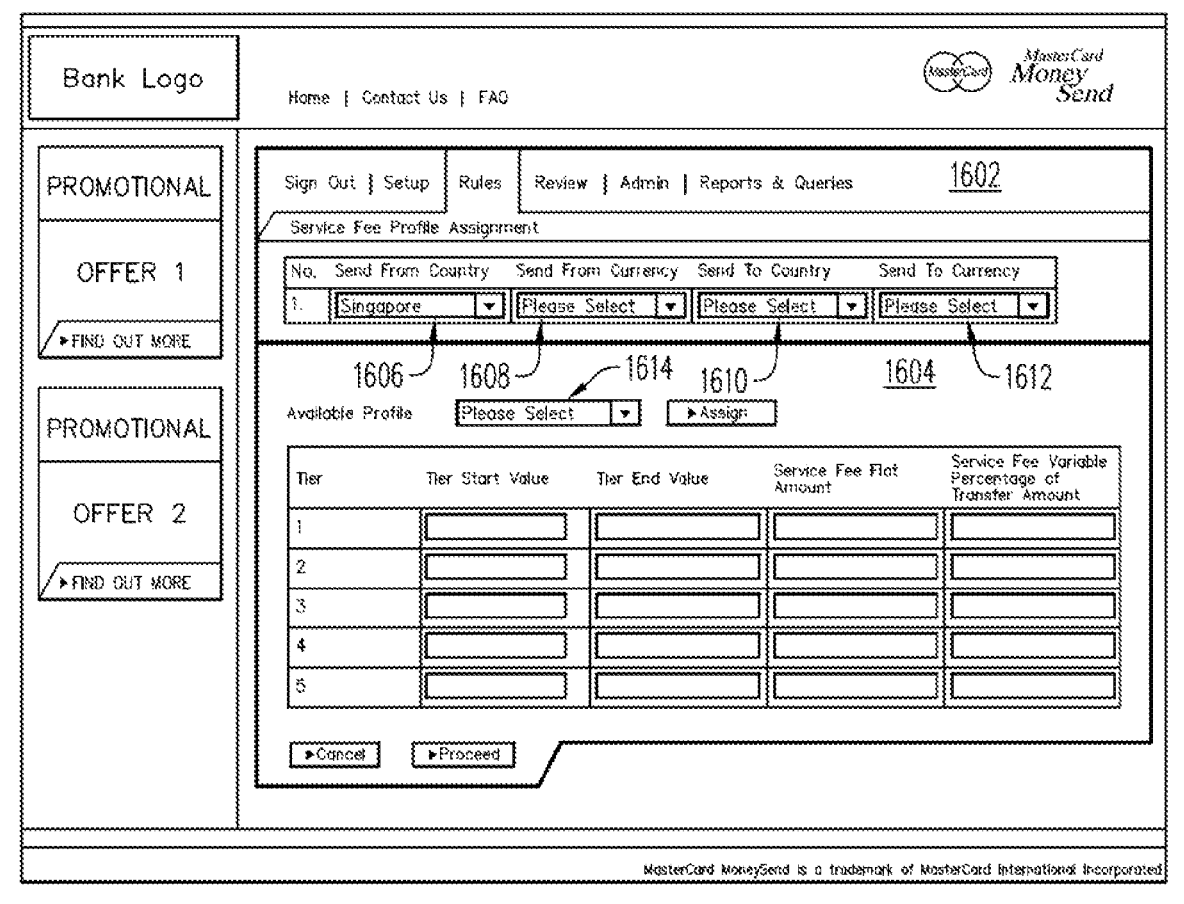

Referring then to FIG. 15, at 1502 in FIG. 15 it is determined whether the user has opted to assign a fee profile to a class of remittance transactions. If so, then step 1504 follows. At 1504, a data entry page screen display as shown in FIG. 16 is provided. Referring to FIG. 16, the screen display includes an upper portion 1602 and a lower portion 1604. In contrast to much of the data entry described with reference to FIGS. 10-14, most if not all of the data entry performed in the process of FIG. 15 (and performed with use of the data entry screen display of FIG. 16) may be accomplished by interaction with pull down menus. The screen display shown in FIG. 16 includes, in the upper portion 1602, four pull down menus 1606, 1608, 1610 and 1612 for defining a class of remittance transactions to which a service fee profile is to be assigned. The class of transactions may be defined in terms of (a) the country from which the remittance is sent ("sender country"), (b) the currency in which the remittance is funded ("sender currency"), (c) the country to which the remittance is sent ("recipient country"), and (d) the currency in which the remittance is disbursed ("recipient currency"). These four parameters may be considered to define a currency remittance channel. The pull down menu 1606 may be employed to select the sender country (although, in some embodiments, the pull down menu 1606 may contain only one option, in that the FI in question may originate remittance transactions from only one country—its country of operation). The pull down menu 1608 may be employed to select the sender currency. The pull down menu 1610 may be employed to select the recipient country. The pull down menu 1612 may be employed to select the recipient currency.

It will be recognized that defining a currency remittance channel inherently includes selecting a pair of currencies, namely the sender currency and the recipient currency.

Continuing to refer to FIG. 16, the lower portion 1604 of the screen display includes a pull down menu 1614, which may be used to select a previously stored service fee profile for assignment to the currency remittance channel defined with the pull down menus 1606-1612.

Figure 17:
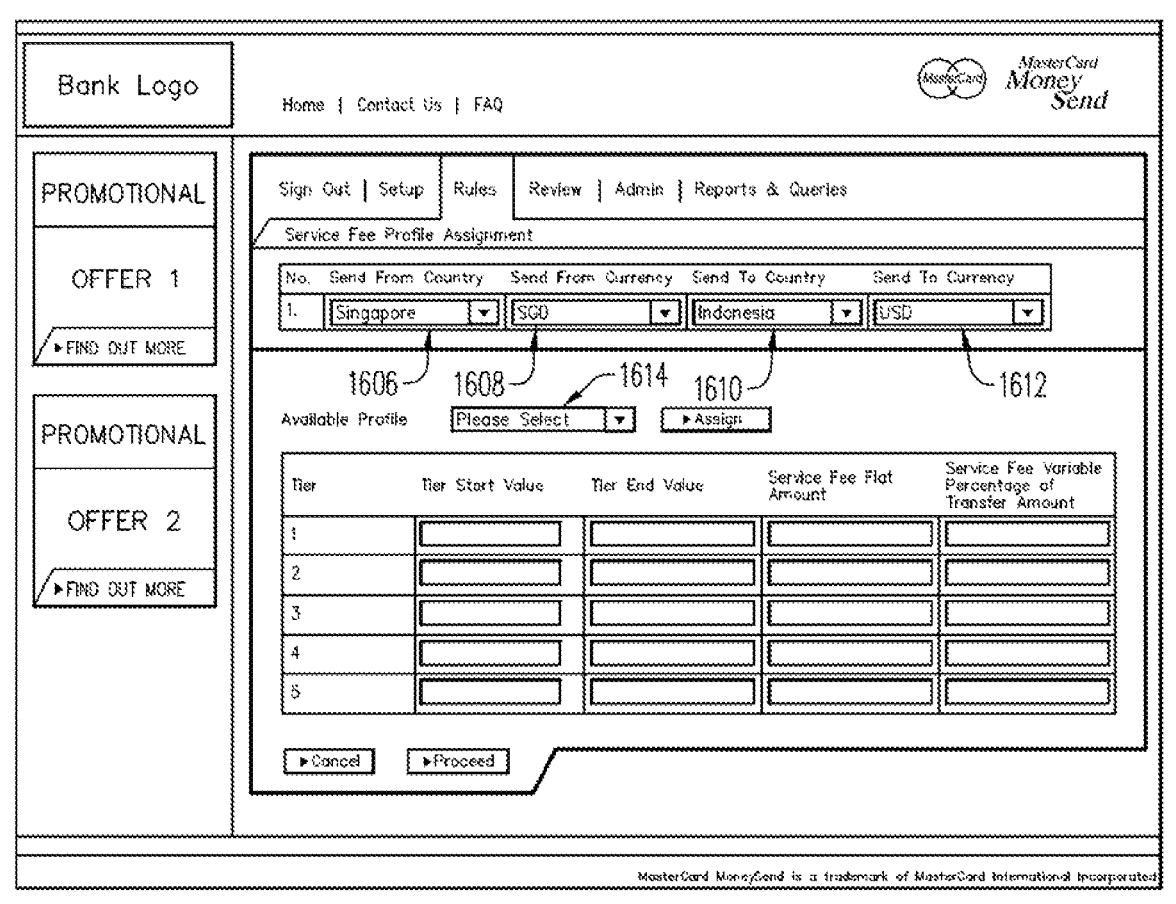

Referring once more to FIG. 15, following step 1504 is step 1506. At step 1506, a currency remittance channel is defined, by the user interacting with the pull down menus 1606-1612 to select the four parameters for the currency remittance channel. (As noted before, the first parameter—the sender country—may be fixed.) FIG. 17 is a screen display that shows a currency remittance channel that has been selected. In the example screen display of FIG. 17, the sender country is Singapore, the sender currency is Singapore dollars, the recipient country is Indonesia, and the recipient currency is U.S. dollars.

Figure 18:
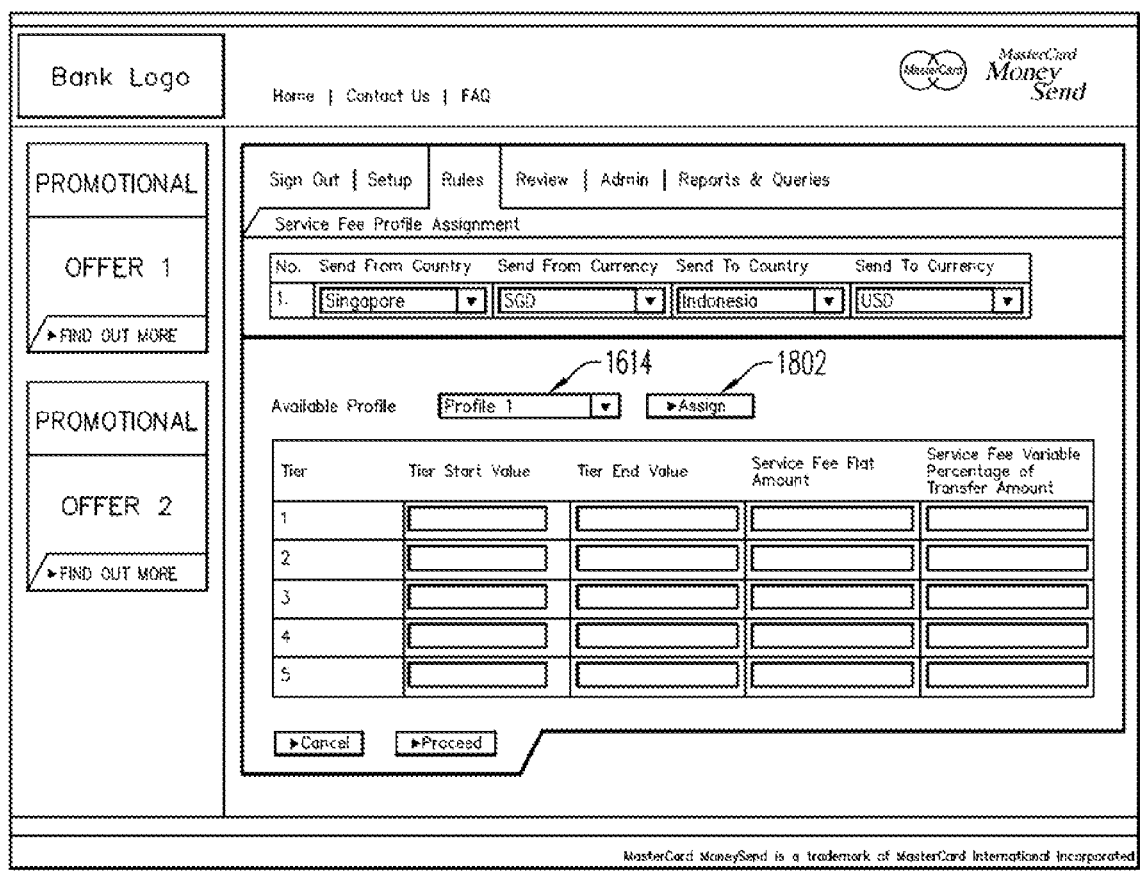
Figure 19:
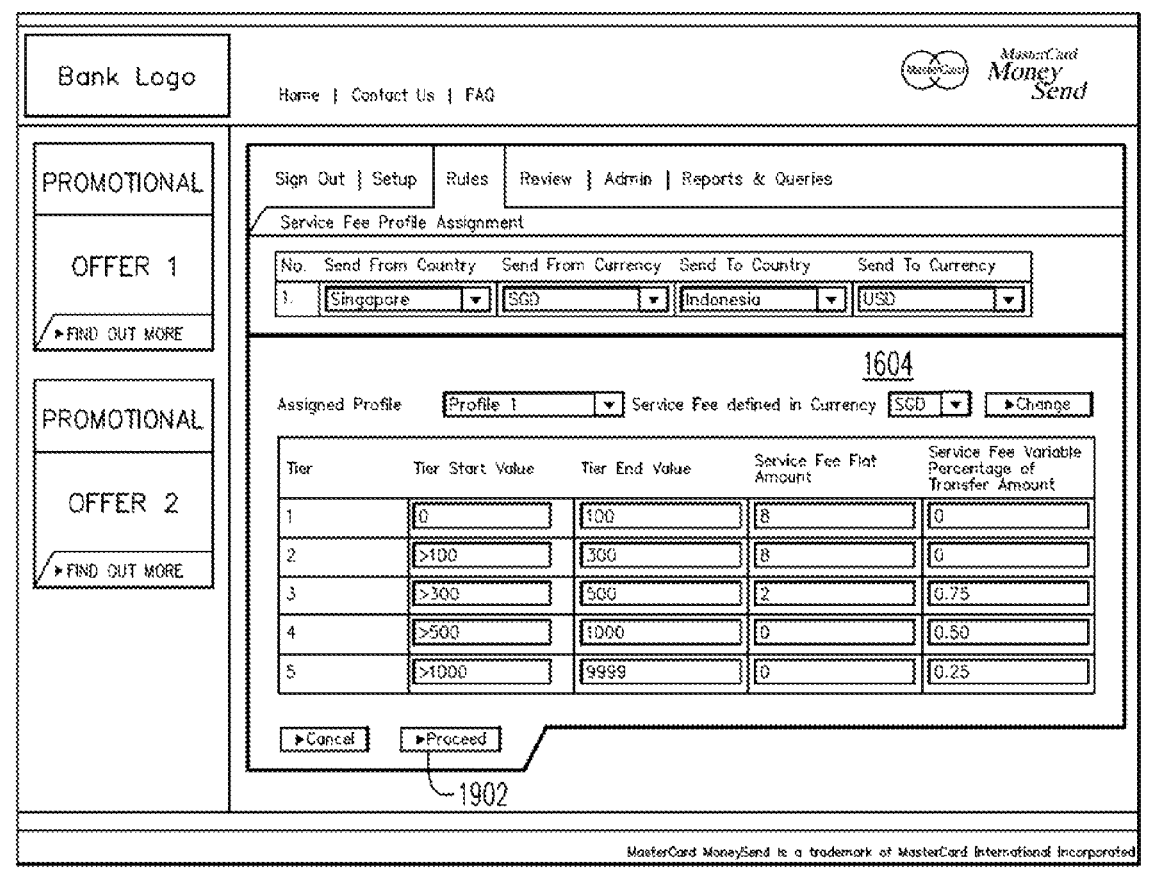

Referring yet again to FIG. 15, step 1508 follows step 1506. At step 1508, the user selects a service fee profile by interacting with the pull down menu 1614. FIG. 18 is a screen display that shows that a certain service fee profile (in this example, the profile previously designated as "Profile 1") has been selected from the pull down menu 1614. Next, at step 1510 in FIG. 15, the user may assign the selected service fee profile to the currently defined currency remittance channel by actuating the "Assign" button shown at 1802 in FIG. 18. FIG. 19 is the screen display that is presented upon actuation of the "Assign" button (seen in FIG. 18, not included in the screen display of FIG. 19). In FIG. 19, the grid of data display fields in the lower portion of the screen display is employed to present to the user the fee structure defined in the selected and assigned service fee profile. With the fee structure in front of him/her, the user may confirm the assignment of the fee profile to the currency remittance channel by actuating the "Proceed" button 1902. Another button, which is not shown in FIG. 19, may also be present to allow the user to go back to an earlier screen in order to select a different fee profile for assignment to the currency remittance channel.

In some embodiments, the assignment of the fee profile to the currency remittance channel may be tentative or provisional in the sense that it may require approval from a higher level manager within the FI.

Figure 20:
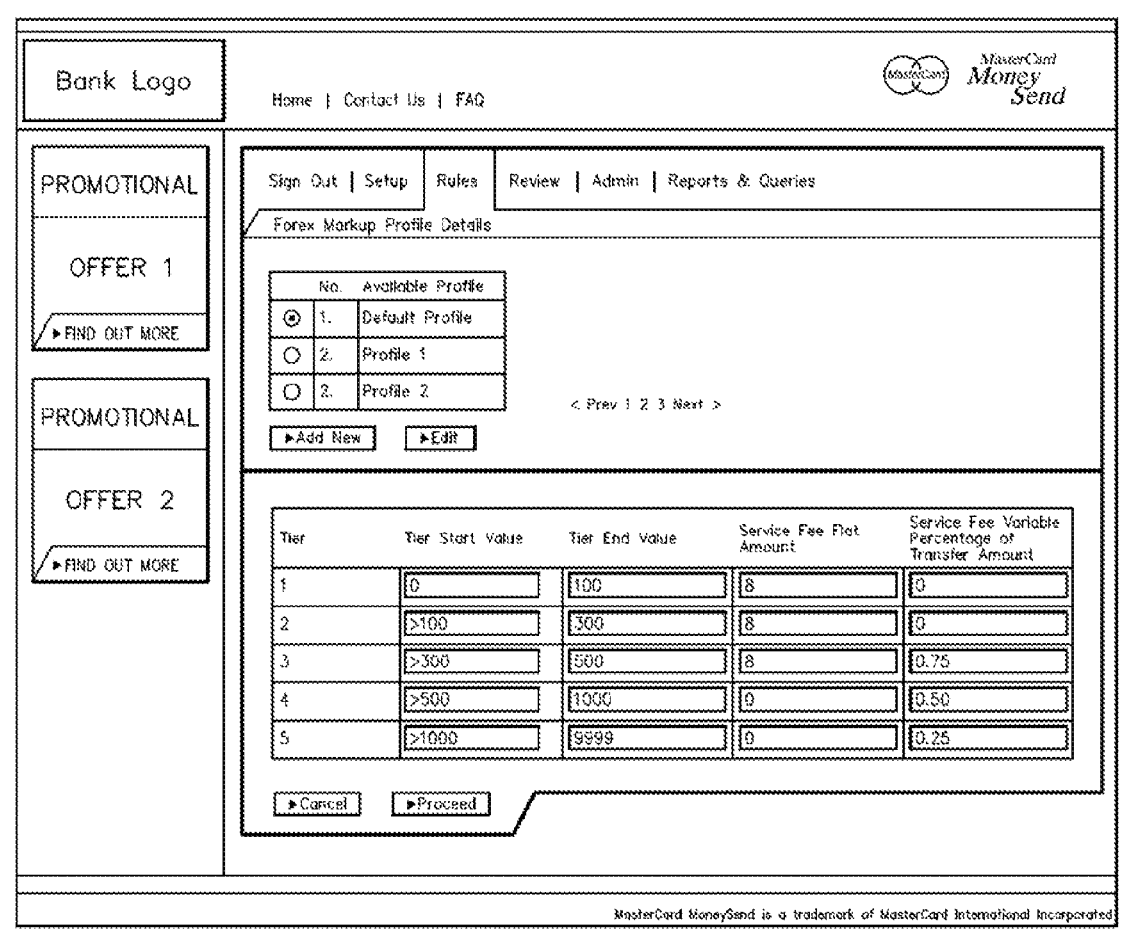

Considering again the "Rules" menu 512 (FIG. 5A), if the user selects the "Forex Markup Profile Setup" option from the menu 512, then a process similar to that of FIG. 10 is launched and a data entry screen display as in FIG. 20 is provided. Data entry for defining a foreign exchange conversion fee profile may be performed by interaction with the data entry screen display of FIG. 20 and in a similar manner to the service fee profile definition process described above with reference to FIGS. 10-14. In view of the above explanation of FIGS. 10-14 and the similar operability of FIG. 20 in comparison with FIG. 11, those of ordinary skill in the art will not require a further explanation of FIG. 20 and the associated process for defining a foreign exchange conversion fee profile.

Figure 21:
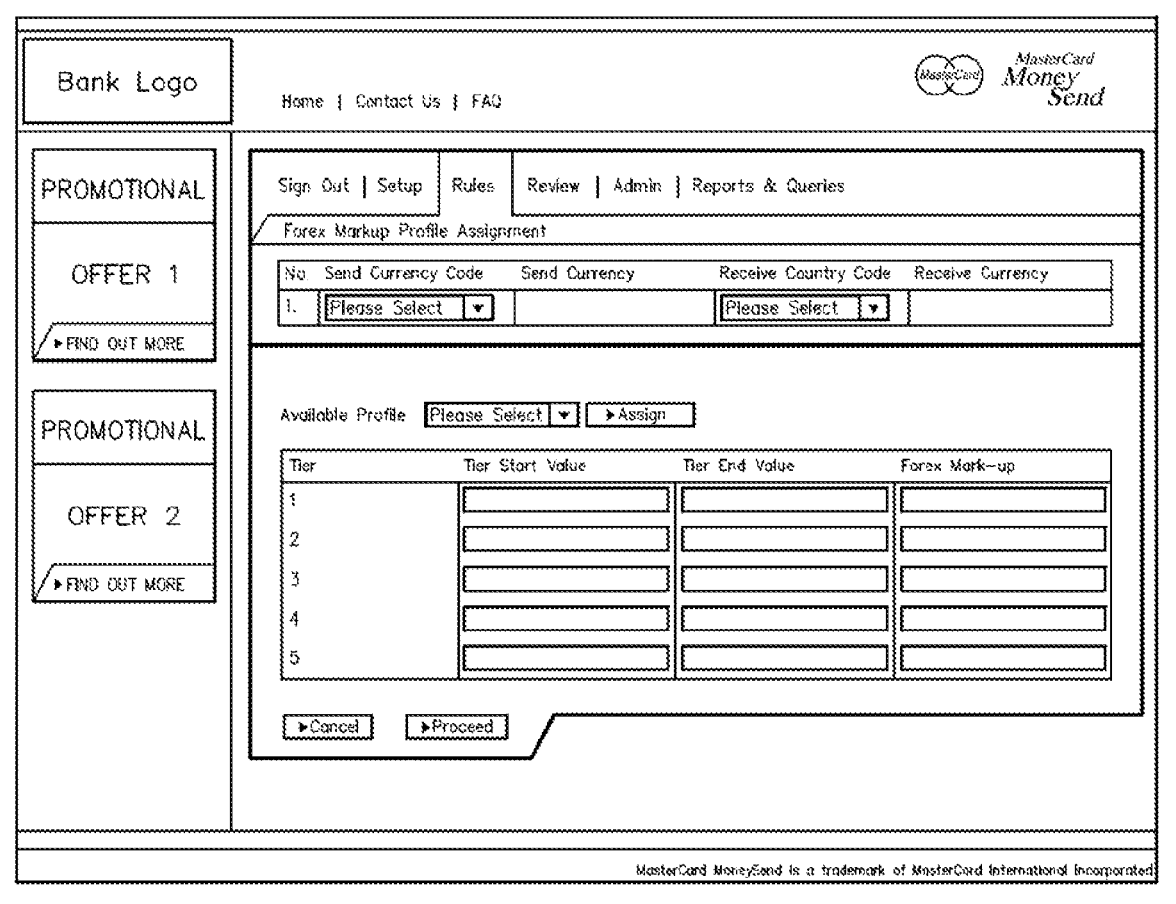

Again with regard to the "Rules" menu 512, if the user selects the "Forex Markup Profile Assignment" option from menu 512, then a process similar to that of FIG. 15 is launched and a data entry screen display as in FIG. 21 is provided. Data entry for assigning a foreign exchange conversion fee profile to a class of transactions may be performed by interaction with the data entry screen display of FIG. 21 and in a similar manner to the service fee profile assignment process described above with reference to FIGS. 15-19. One difference between the foreign exchange conversion fee profile assignment process and the service fee profile assignment process is that the former may only require selection of two currencies (the sender currency and the recipient currency) where as the latter also may require selection of the sender country and the recipient country. Otherwise, the similarity between the two profile assignment processes is such that FIG. 21, taken with the above discussion of FIGS. 15-19, is sufficient to make the foreign exchange conversion fee profile assignment process understood by those who are skilled in the art.

Figure 22:
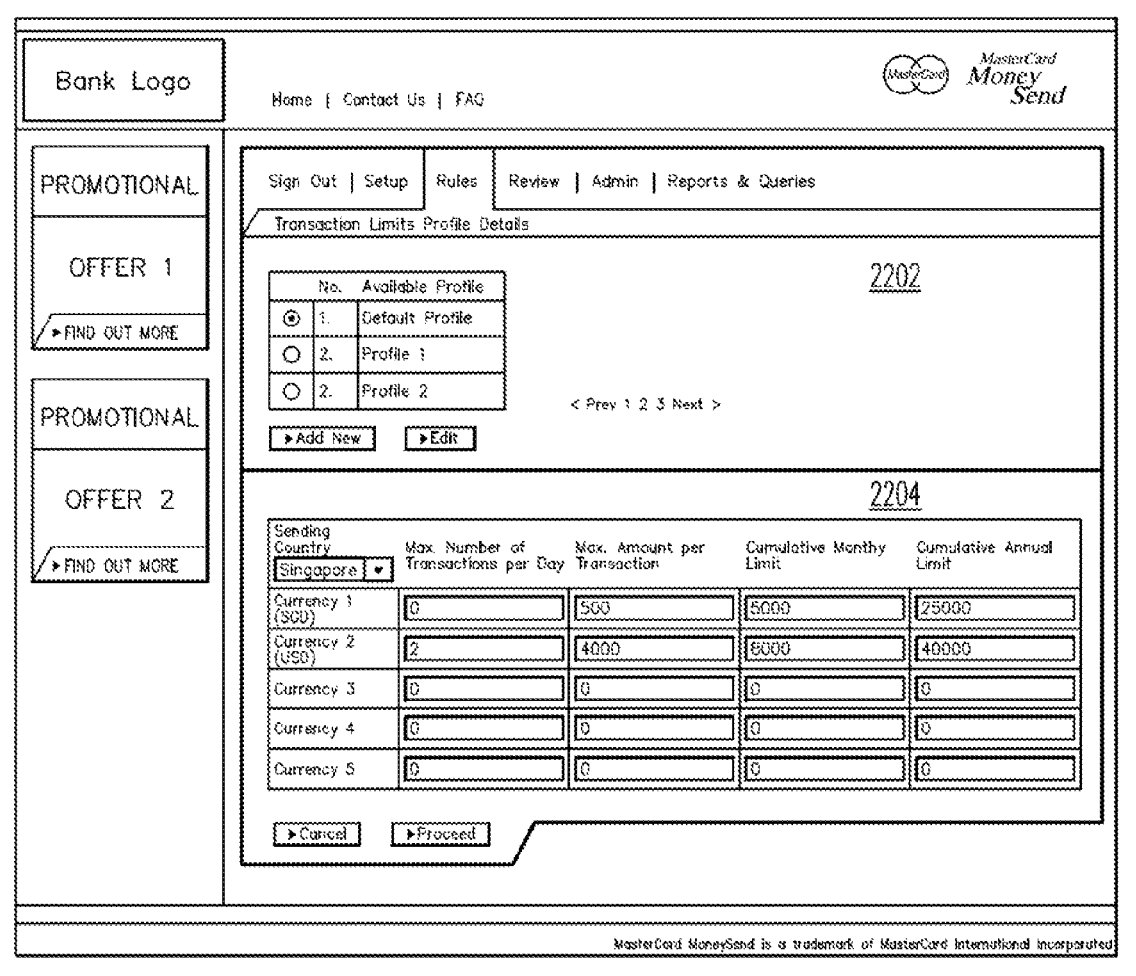

Referring once more to the "Rules" menu 512, if the user selects the "Transaction Limits Profile Setup" option from menu 512, then a data entry screen display as in FIG. 22 is provided. It will be noted that an upper portion 2202 in FIG. 22 allows for designation of a new transaction limits profile to be defined or an existing transaction limits profile to be edited. A lower portion 2204 of FIG. 22 mainly comprises a grid of data entry fields that the user may employ to enter limits on transactions in a number of different currencies. The limits may be defined in terms of a maximum number of transactions per day, maximum currency amount per transaction and/or maximum cumulative transaction amounts over one or more periods of time.

Figure 23:
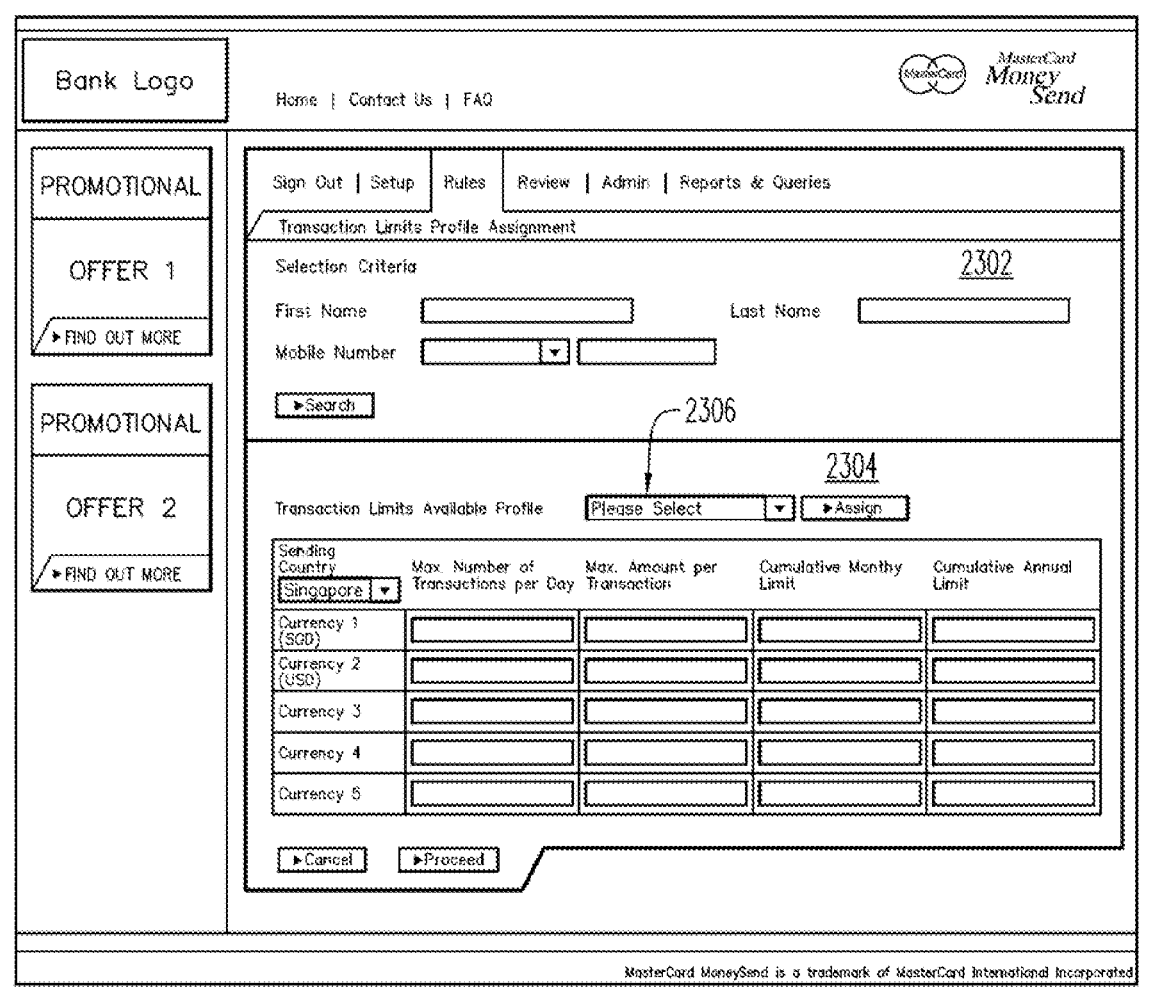

Again with respect to the "Rules" menu 512, if the user selects the "Transaction Limits Profile Assignment" option from menu 512, then a data entry screen display as in FIG. 23 is provided. An upper portion 2302 of the screen display of FIG. 23 includes one or more data entry fields and/or pull down menus that the user may employ to identify a customer or class of customers to which a transaction limits profile is to be assigned. The lower portion 2304 of the screen display of FIG. 23 may include a pull down menu 2306 by which the user may select a previously stored transaction limits profile to be assigned to the customer(s) or class(es) of customers defined in the upper portion of the screen display.

Figure 24:
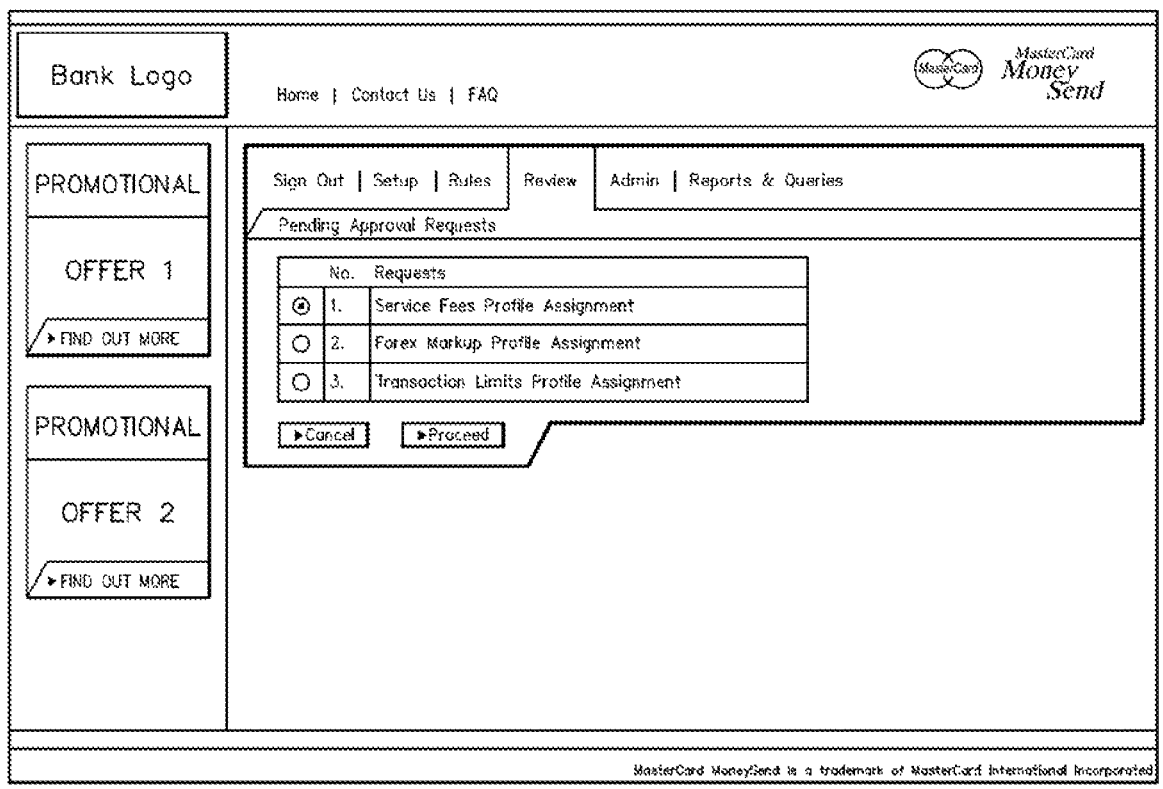

Upon pulling down the "Review" menu 514 (FIG. 5A), the user sees the menu options "Pending Requests", "Approved Requests", "Rejected Requests" and "Suspect Customers". If the user selects the "Pending Requests" option, then a screen display as shown in FIG. 24 may be provided. The user may select one of the radio buttons in FIG. 24 and then click "Proceed" to call up a report of (a) service fee profile assignments awaiting higher level approval, (b) foreign exchange conversion fee profile assignments awaiting higher level approval, or (c) transaction limits profile assignments awaiting higher level approval. Thus the display screen of FIG. 24 may be useful to the user in managing the approval process for profile assignments.

If the user selects the "Approved Requests" or "Rejected Requests" options in menu 514 he/she may be provided with a screen display similar to FIG. 24, for allowing the user to call up reports concerning approved or rejected profile assignments.

Figure 25:
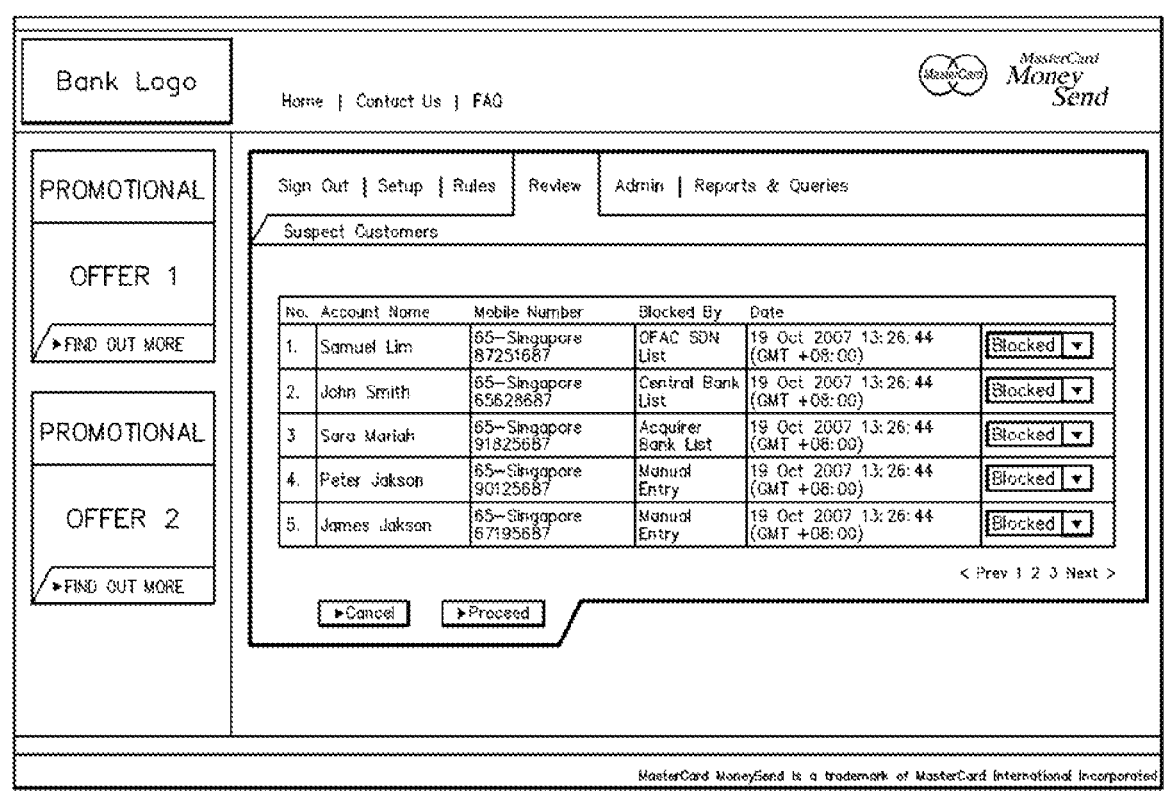

"If the user selects the "Suspect Customers" option in menu 514, then a screen display like FIG. 25 may be provided. The screen display of FIG. 25 may present a report that individually lists customers who have apparently come up on anti-money laundering or antiterrorism watch lists, or the like. The screen display may also include a drop down menu (not shown) for each listed customer, to allow the user to select a status for the customer such as "Blocked" (i.e., prevented from initiating and/or receiving remittances) or "Active" (i.e., not "Blocked").

Figure 26:
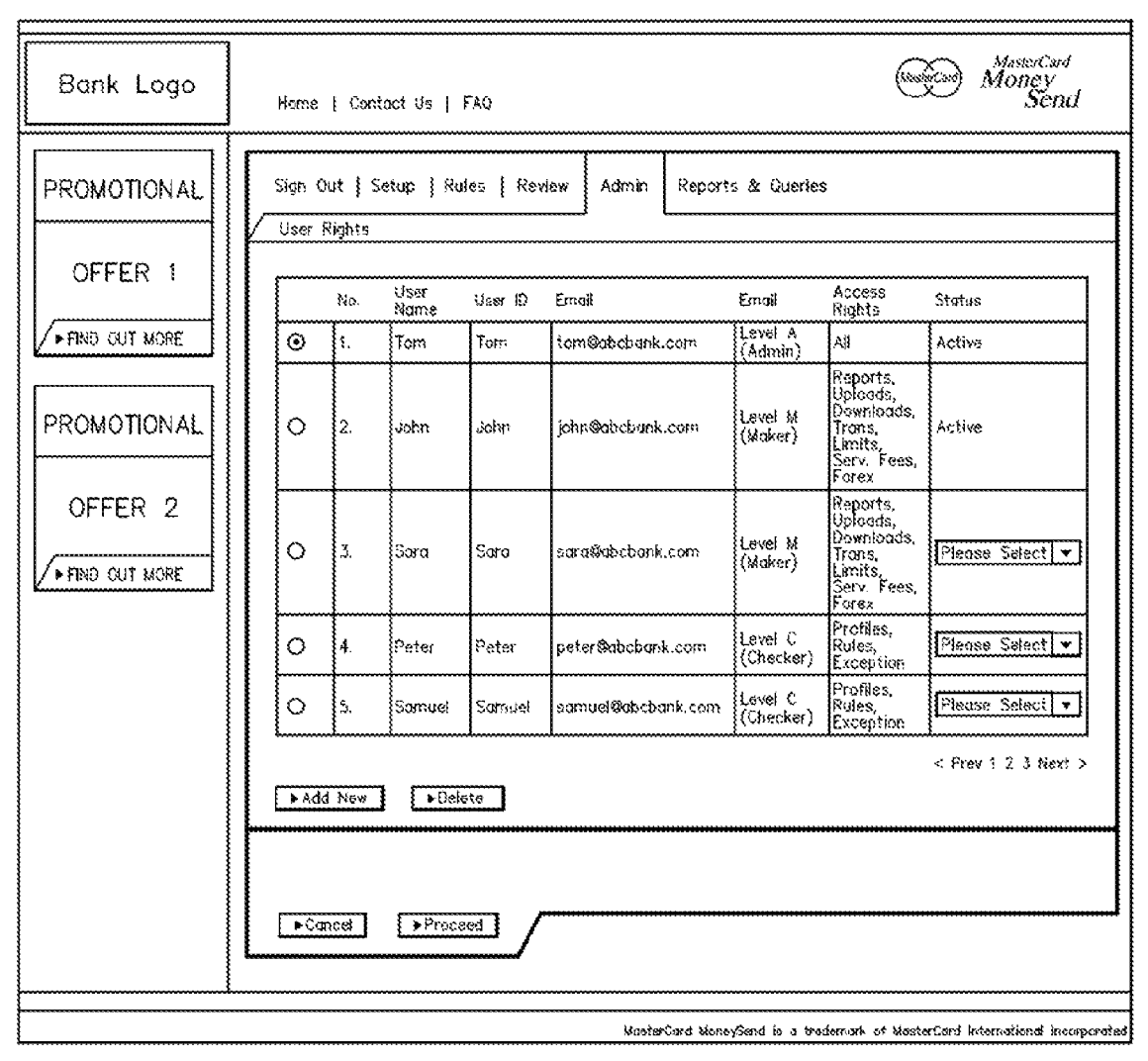

Returning now to FIG. 5A, if the user pulls down the "Admin" menu 516, the following menu options are available: "User Rights", "Uploads", and "Add Suspect Customer". If the user selects the "User Rights" option, then a screen display like FIG. 26 is provided. FIG. 26, in an essentially conventional manner, allows a supervisory user to define access rights for various registered users of the system.

Figure 27:
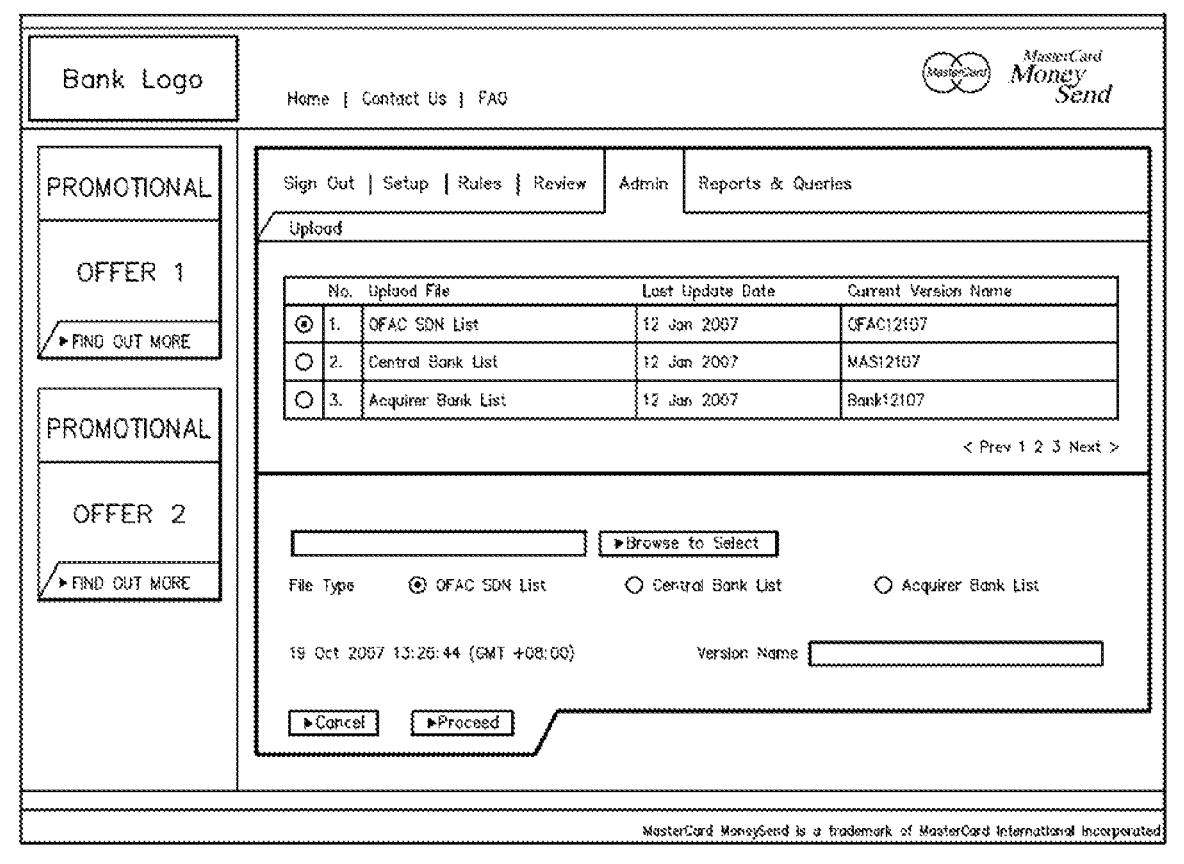

If the user selects the "Uploads" option from menu 516, then a screen display like FIG. 27 is provided. The screen display 27 may be manipulated by the user to select files for uploading.

Figure 28:
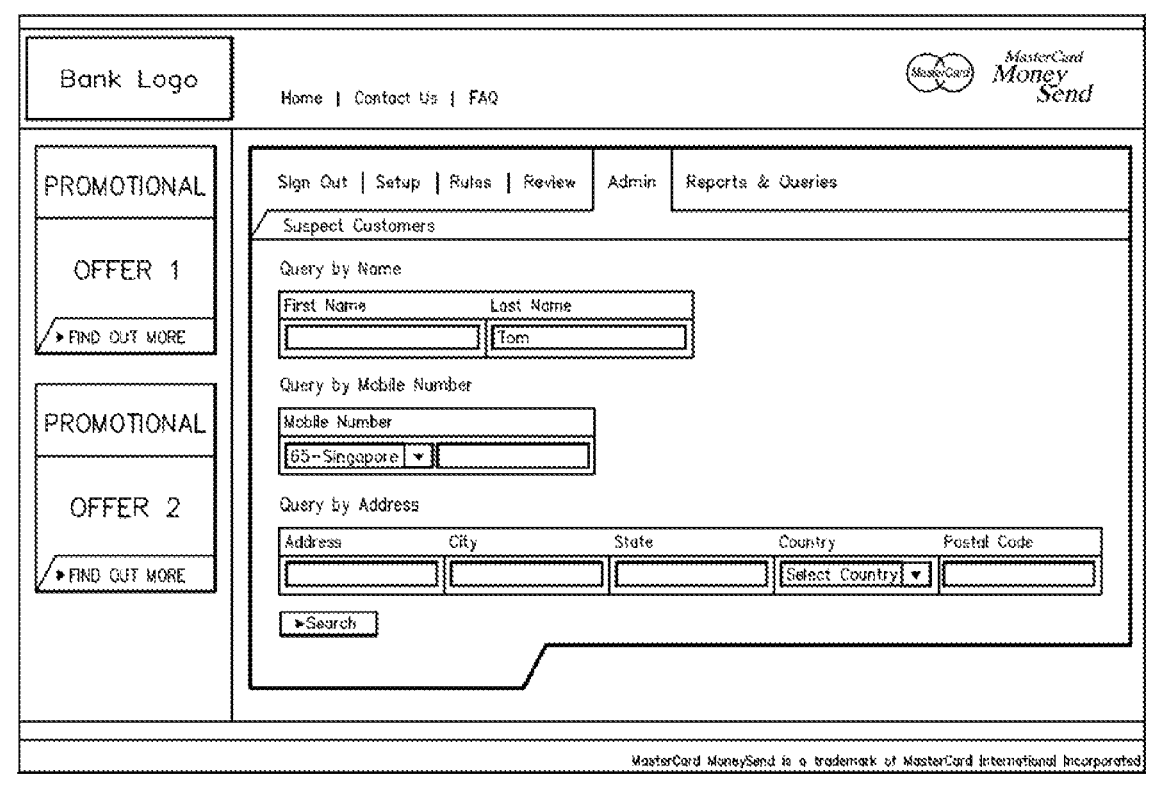

If the user selects the "Add Suspect Customer" option from menu 516, then a screen display like FIG. 28 is provided. The user may employ the screen display of FIG. 28 to launch a search for certain customers by name, by address, etc., and then may use an additional screen display (not shown) to select one or more customers from the search results to a list of suspect customers.

Figure 29:
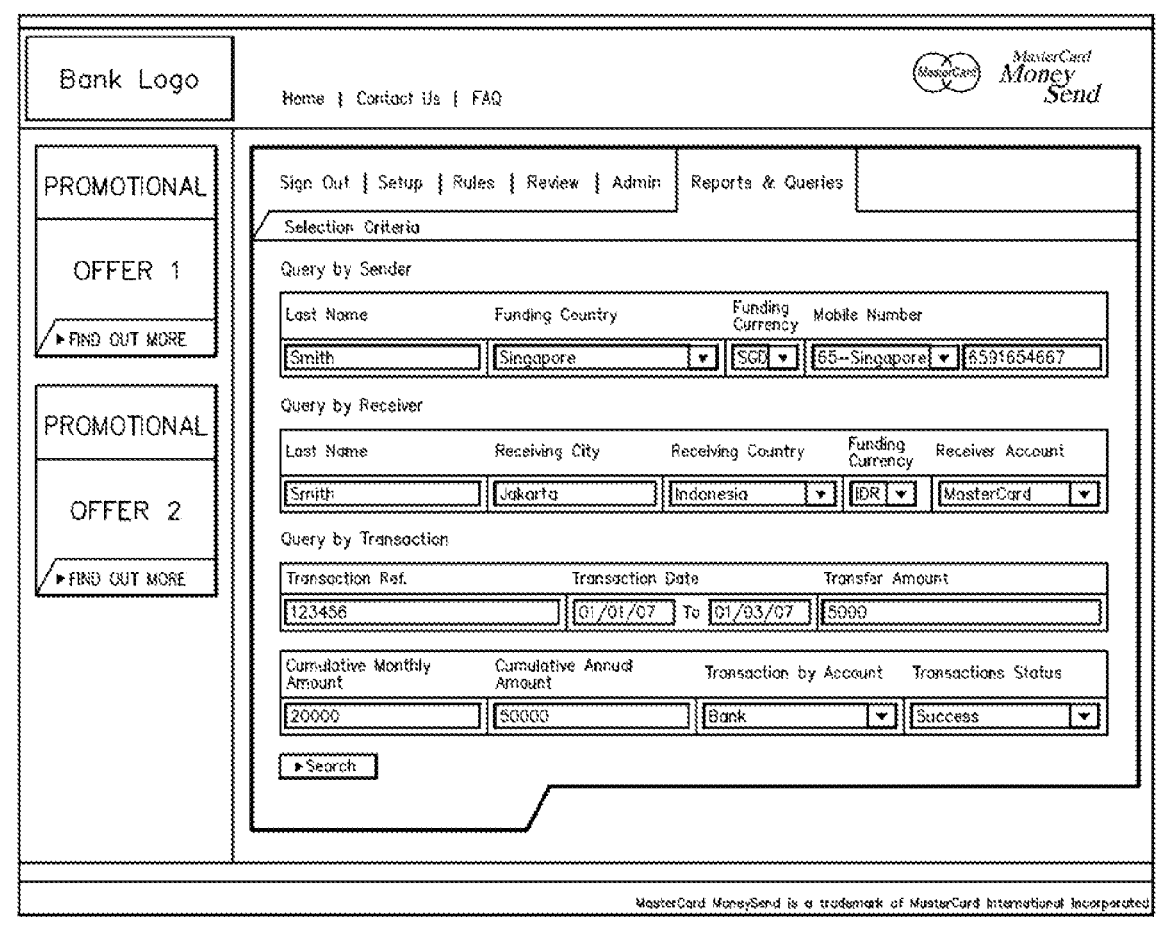
Figure 30:
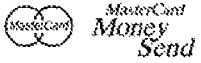

Referring once more to FIG. 5A, if the user pulls down the "Reports & Queries" menu 518, the following menu options are available: "Queries" and "Reports". If the user selects the "Queries" option, then a query form (screen display) like FIG. 29 is provided to allow the user to query a transaction database as to one or more particular customers and/or one or more particular transactions. If the user selects the "Reports" option, then a screen display like FIG. 30 is provided, to allow the user to select a report for printing and/or export to an external spreadsheet program.

The discussion will now turn, from the FI administrative tools illustrated in FIGS. 5-30, to aspects of a customer user interface, as represented in FIGS. 31-41.

Figure 31:
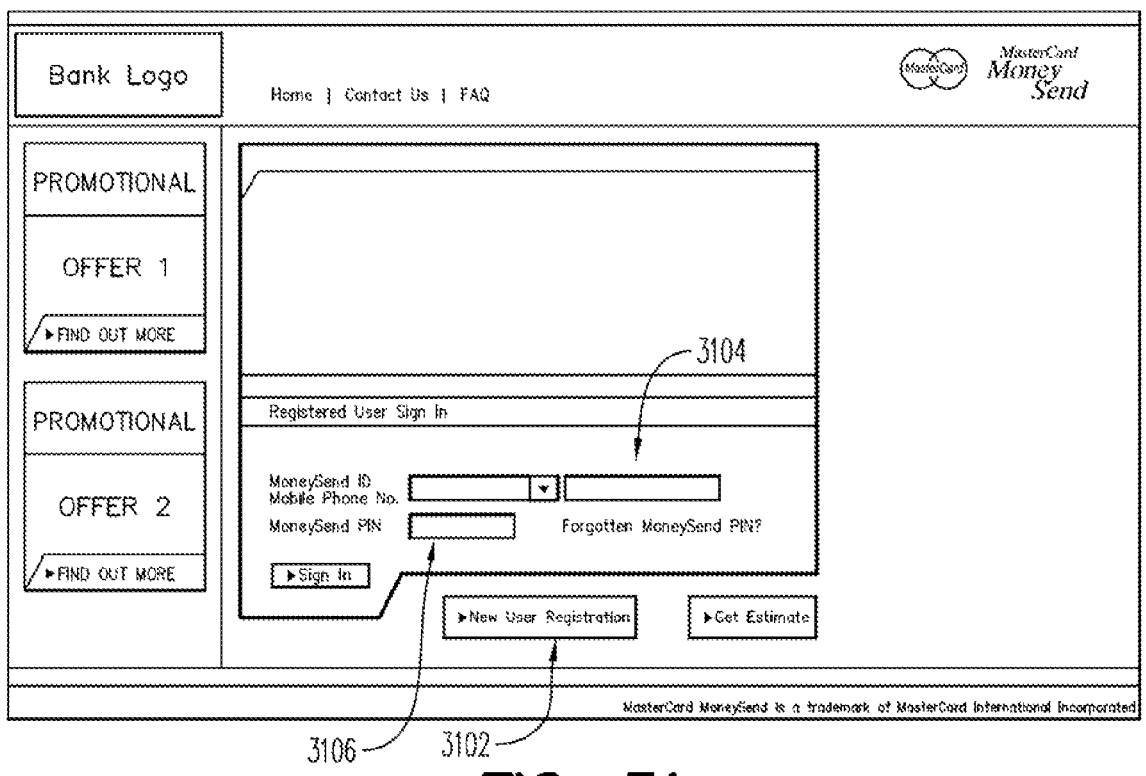
Figure 33:

FIG. 31 shows a sign-in screen display that may be accessed by a customer (or prospective customer) of an FI in connection with the system of FIG. 2. As is also the case with the screen displays shown in FIGS. 32-41, the screen display of FIG. 31 may be downloaded from a computer 202 (FIG. 2) operated by or on behalf of the FI, and displayed on the display screen of a personal computer operated by the customer and in communication with the computer 202. In FIG. 31, a new prospective customer may actuate a "New User Registration" button 3102 to access a screen display like that shown in FIG. 32. The prospective customer may then use the data entry fields in the screen display of FIG. 32 to begin registering with the system by entering personal information. Once the personal information (including mobile telephone number) has been entered, and the customer has indicated that the data entry is complete, the system may then automatically place a telephone call to the customer's mobile telephone to confirm at least that the customer really is in possession of the telephone that has been assigned the mobile telephone number that the customer has entered. After this procedure has been successfully completed, the customer has been registered in the system as a customer-user and is then prompted to proceed with registering his/her payment card account that is to be used for funding remittance transactions. A data entry display screen that the customer may use to identify the funding account is shown in FIG. 33. It will be observed that the funding account may be a payment card account such as an account issued by the FI under the "MasterCard" brand.

Figure 34:
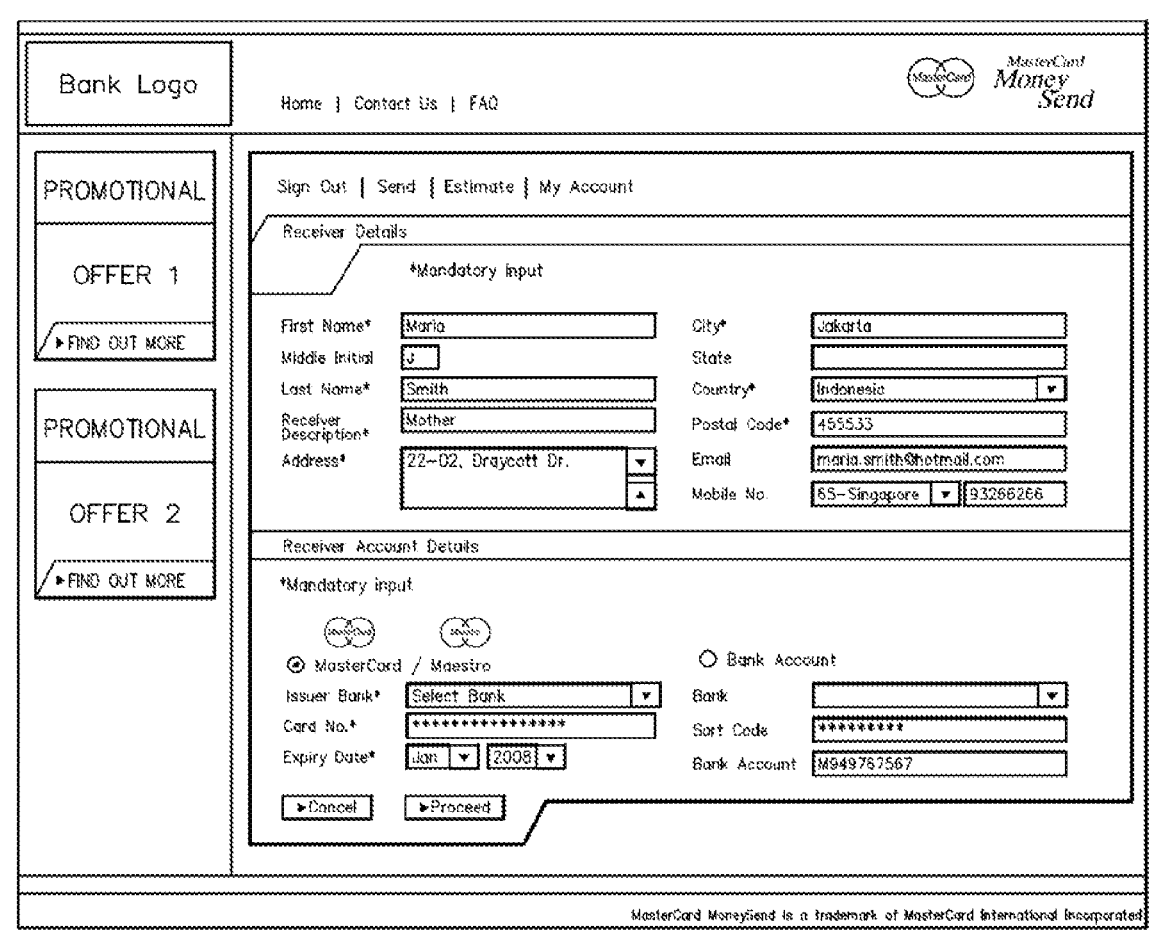

Once the customer has entered the funding account information, he/she may next be prompted to proceed with storing information that identifies a recipient to whom the customer intends to send remittances via the system. A data entry display screen that may be used for this purpose is shown in FIG. 34. Part of the information required to complete this display screen includes the payment card account of the recipient, so that remittances to the designated recipient may be routed as "payment transactions" in a payment card system.

Figure 34A:
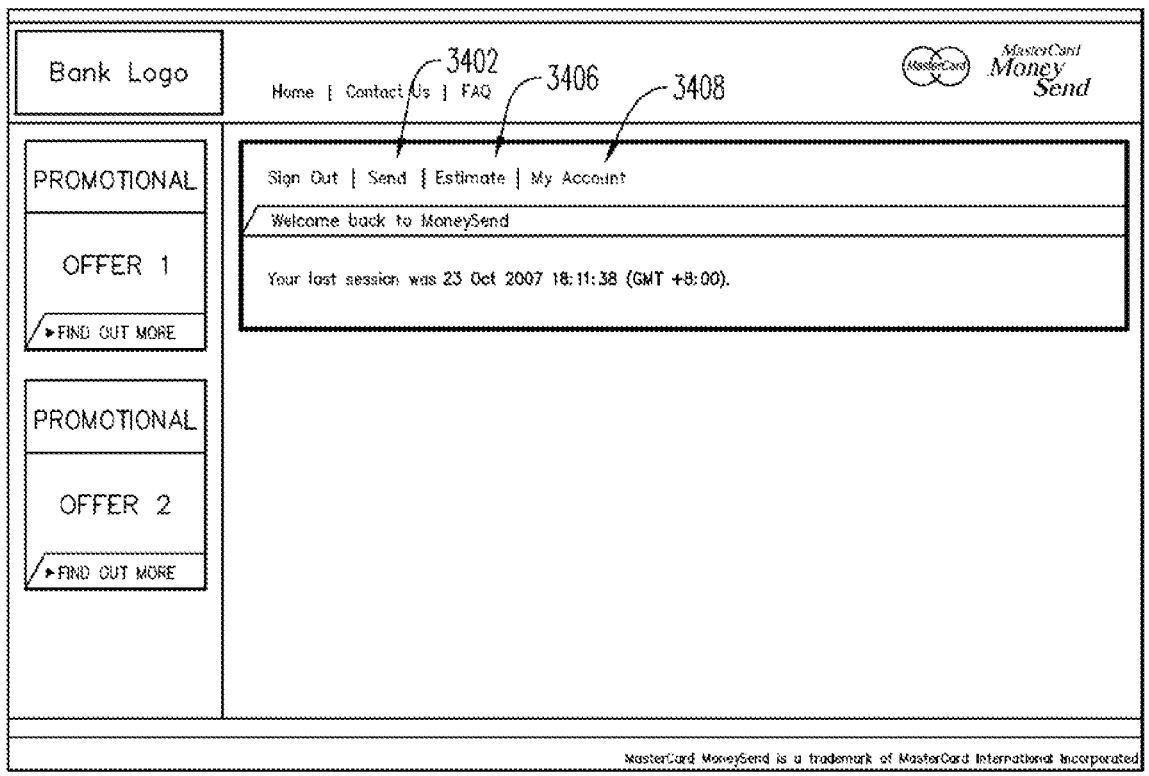

Returning to FIG. 31, the customer (now assumed to be a previously registered customer) may use data entry fields 3104, 3106 to enter his/her user identification (e.g., his/her mobile telephone number) and PIN. Upon verification of the user ID and PIN, the screen display shown in FIG. 34A is presented. This screen display is a main menu page, and includes options 3402 ("Send"), 3406 ("Estimate") and 3408 ("My Account"), with the latter being a pull down menu.

If the customer pulls down the "My Account" menu 3408, the menu options that are displayed may be "Personal Details", "Mobile Phone", "PIN", "Funding Accounts", "Receiver Details" and "Transactions". Any these options may be selected by the customer for the purpose of updating information stored in the FI computer 202 relative to the customer's online user account. If the customer selects the "Personal Details" option, then a data entry form (which is not shown) is provided to allow the customer to enter a change of address or otherwise to update personal information.

If the user selects the "Mobile Phone" option, then a data entry form (which is not shown) is provided to allow the customer to enter his/her updated mobile telephone number. In some embodiments, the system automatically calls back the new mobile telephone number to confirm the customer's possession of the mobile telephone in question before the updating operation is allowed to be completed.

If the customer selects the "PIN" option, then a data entry form (which is not shown) is provided to allow the customer to change his PIN.

Figure 35:

If the customer selects the "Funding Accounts" option, then a display screen as shown in FIG. 35 is provided. As will be appreciated from examining FIG. 35, this screen display allows the customer to add one or more new accounts (either payment card accounts or bank accounts) to a list of the customer's accounts that are available to fund remittance transactions. The screen display of FIG. 35 also allows the customer to delete one or more accounts from the list of funding accounts.

Figure 36:

If the customer selects the "Receiver Details" options, then a display screen as shown in FIG. 36 is provided. As will be appreciated from examining FIG. 36, this screen display allows the customer to add an additional recipient's account to the list of accounts to which the customer may send remittances. The screen display of FIG. 36 also allows the customer to delete one or more accounts from the list of recipients' accounts.

Figure 37:
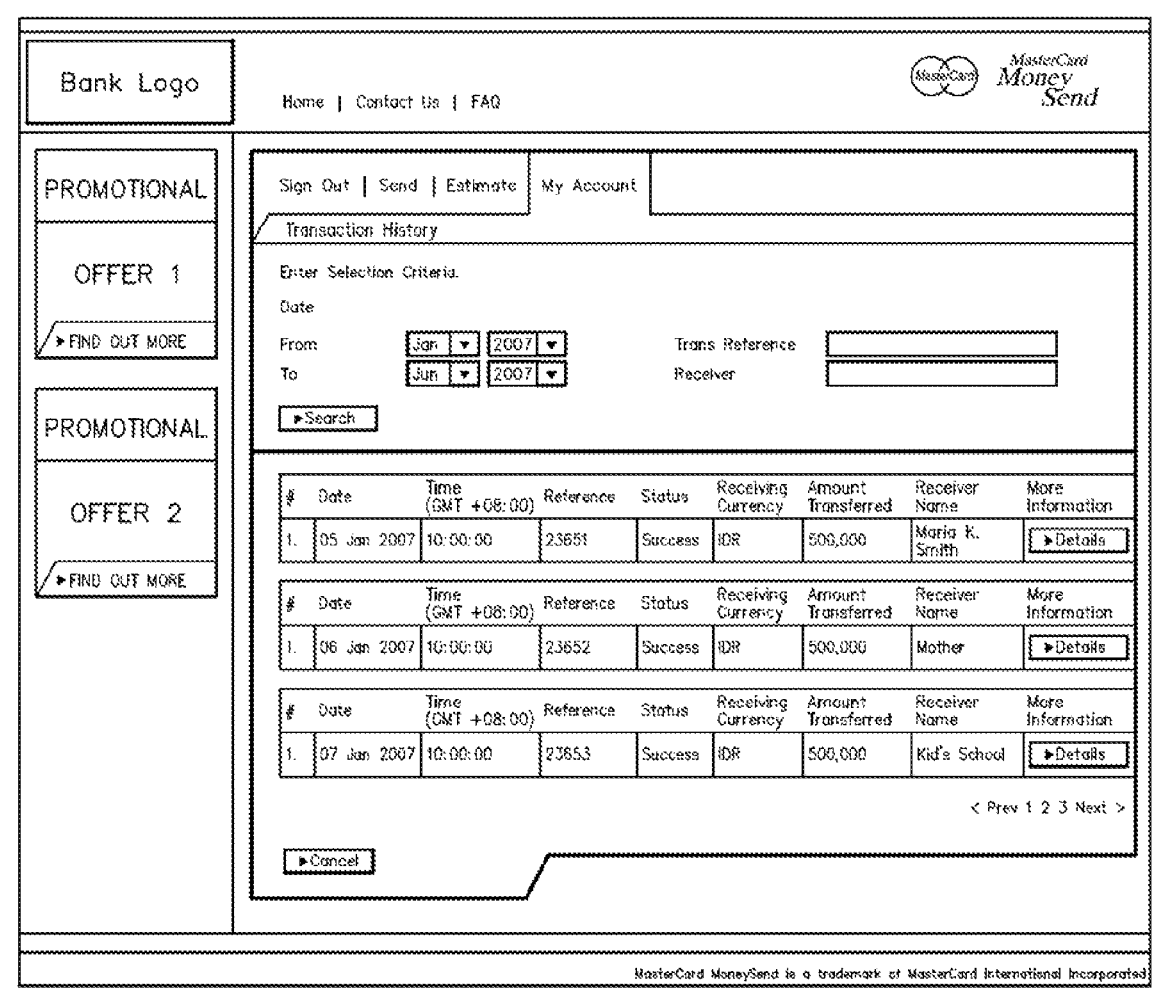

If the customer selects the "Transactions" option, then a search inquiry screen display (not shown) is provided to allow the customer to submit a search query to locate information relating to one or more of the customer's previous remittance transactions. FIG. 37 is an example results page that may be provided in response to a search query of the type that was just described.

Figure 38:
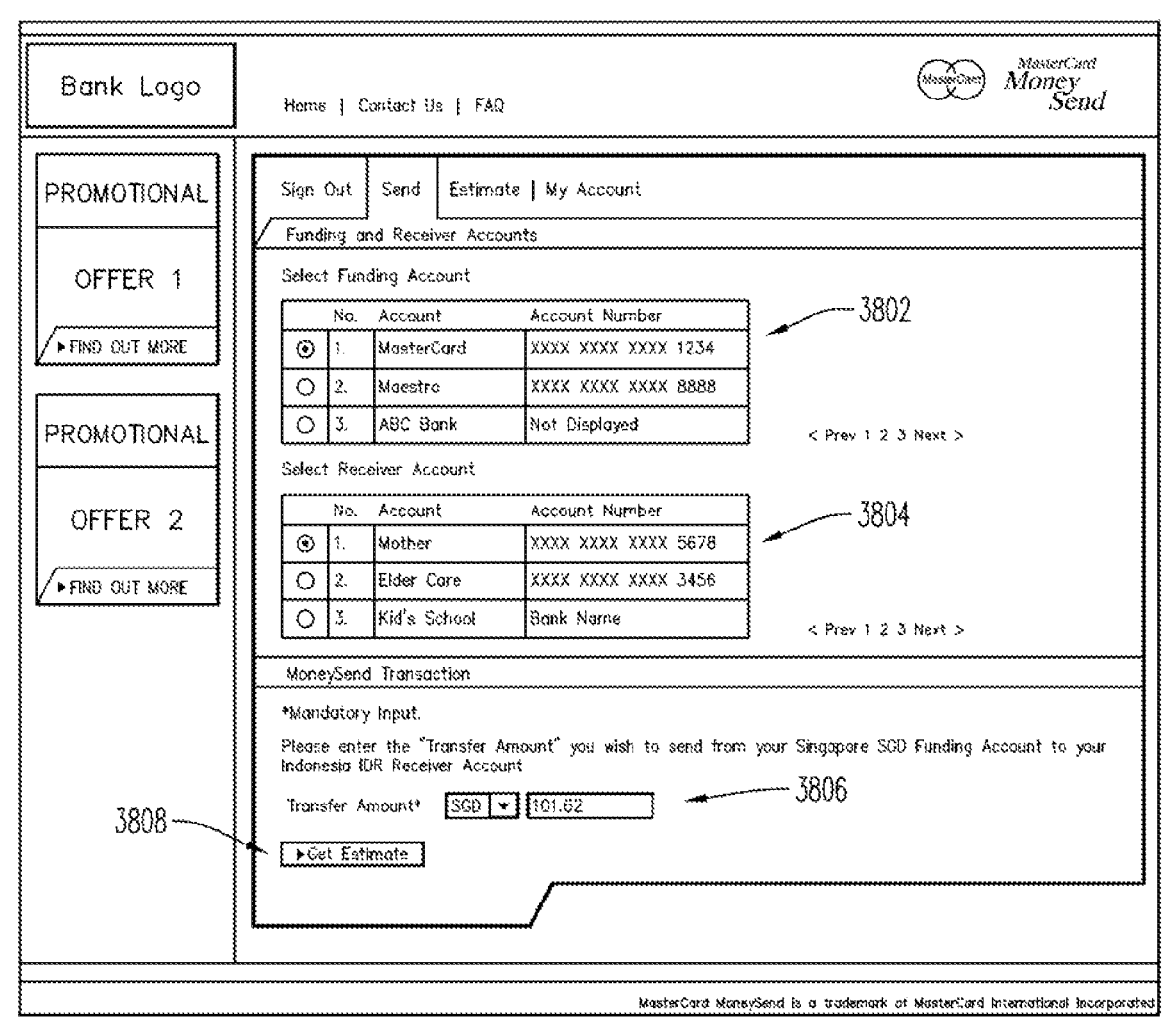

Referring again to FIG. 34A, if the customer wishes to make a remittance, he/she may select the "Send" option 3402, in which case a screen display as shown in FIG. 38 may be provided. The screen display of FIG. 38 includes a list 3802 of the customer's available funding accounts, and a list 3804 of recipients that the customer has previously entered into the system. The customer may select a radio button from the first list 3802 to select a funding account for the desired remittance. The customer may select the recipient for the remittance by selecting a radio button from the second list 3804. By entering a currency amount in the data entry field 3806, the customer may set the amount of money to be transferred to the selected recipient. By clicking on the "Get Estimate" button 3808, the customer can obtain an estimated summary of the cost and outcome of the desired remittance, as presented at 3902 in FIG. 39. The sender currency may be selected automatically by the system based on the currency in which the funding account is denominated, and likewise the recipient currency may be selected automatically by the system based on the currency in which the selected recipient account is denominated. Based on these two currencies and the sender and recipient countries, the system may access the applicable service fee profile(s) for use in determining the service fee and the foreign exchange markup. The base currency exchange rate may be determined from a daily fix obtained from a source of exchange rate information.

Figure 39:
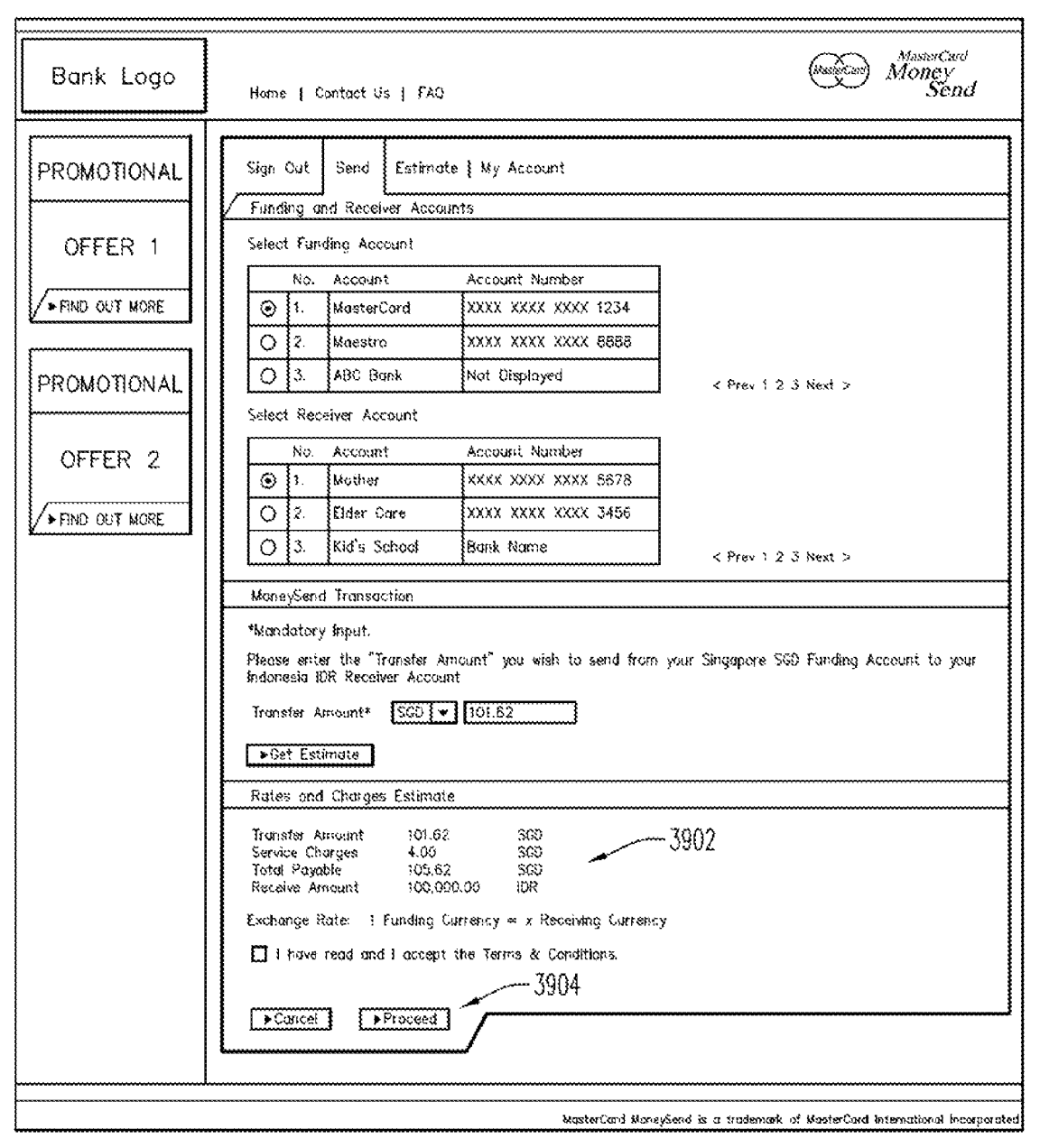
Figure 40:
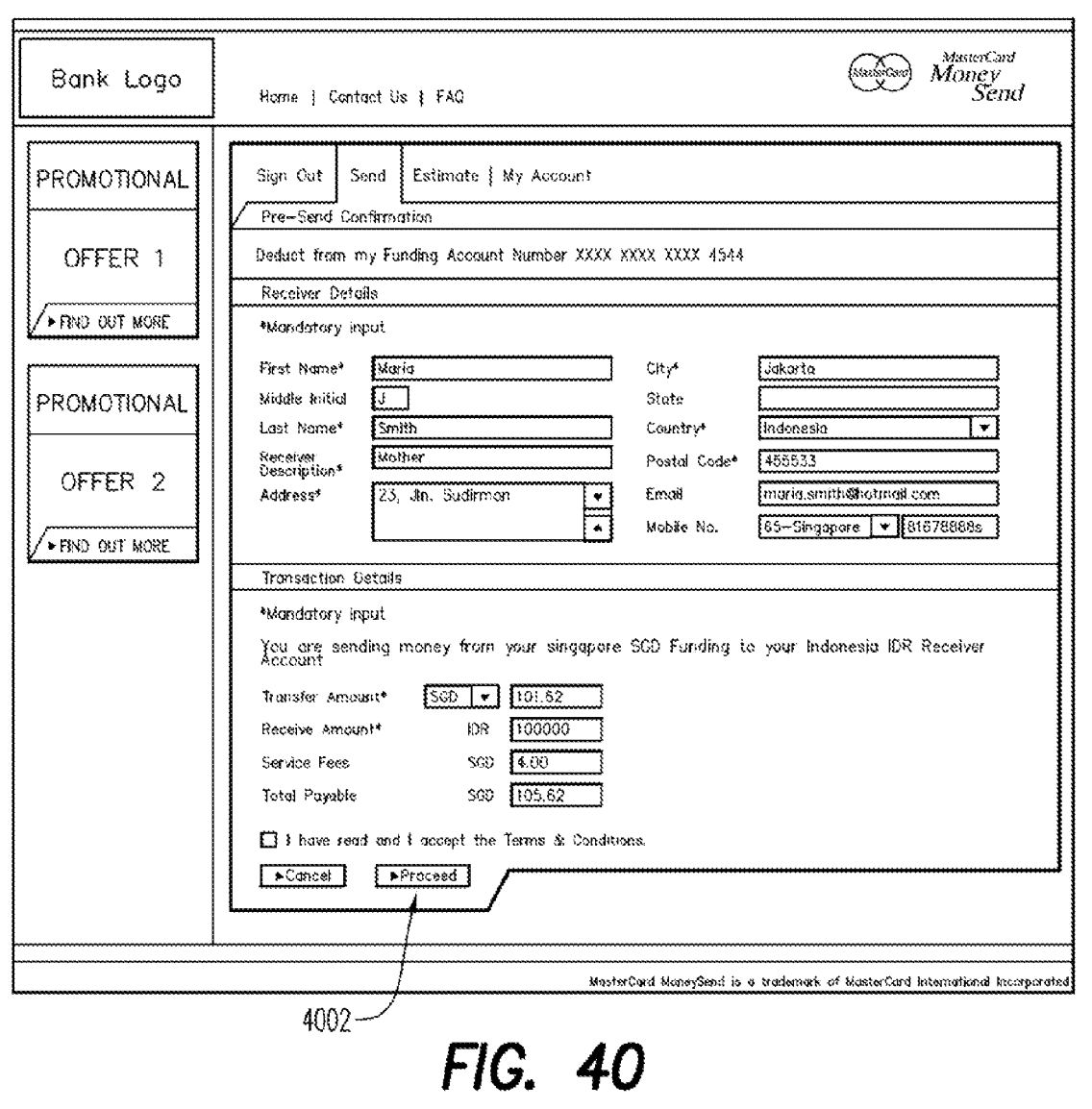
Figure 41:
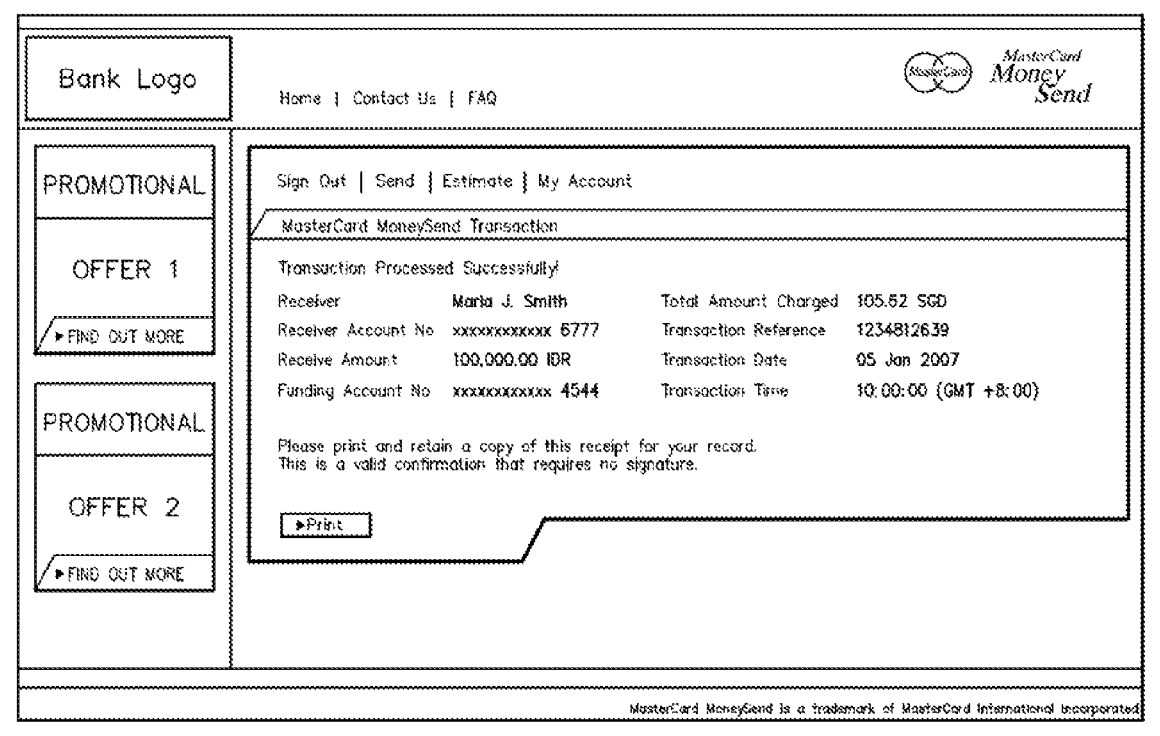

Upon the customer actuating the "Proceed" button 3904 in FIG. 39, the confirmation screen display shown in FIG. 40 is provided. The customer may then cause the desired remittance transaction to be executed by actuating the "Proceed" button 4002 in FIG. 40. Upon the customer doing so, and assuming everything is in order, then the remittance transaction is processed, and the screen display of FIG. 41 is provided to confirm successful processing of the remittance transaction. (In some embodiments, after the customer actuates the "Proceed" button, the FI computer may initiate a telephone call to the customer's mobile telephone, and require the customer to enter a supplementary PIN or the like, before executing the remittance transaction.)

Upon the customer's actuation of the "Proceed" button 4002 in FIG. 40, the customer FI (the sending FI) initiates a payment transaction in the payment card system to implement the remittance requested by the customer, with the payment transaction to be charged to the customer's selected payment card account and to be routed to the selected recipient's payment card account (alternatively a remittance to a non-payment card account may occur, as will be described below in connection with FIGS. 42-46). Conventional processing of a payment transaction in the payment card system may take place, and in addition the recipient may be notified upon completion of the transaction when the transferred funds are available in the recipient's account.

According to some aspects of the invention, the recipient's account selected by the customer need not be a payment card account. Systems and processes will now be described, with reference to FIGS. 42-46, in which a payment card system is employed for remittances to be received in non-payment-card accounts.

Figure 42:
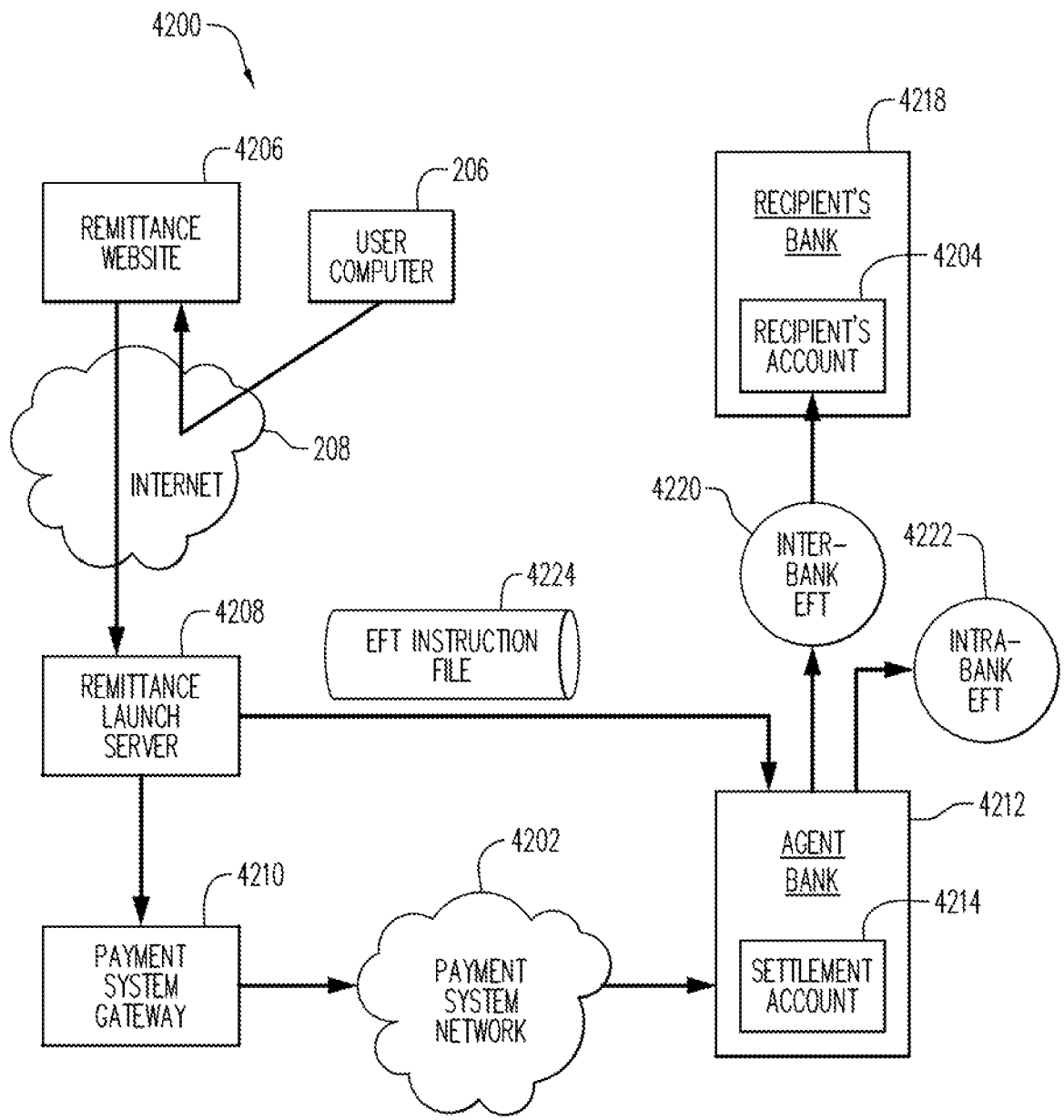
FIG. 42 is a block diagram that illustrates a system in which an international payment card system is used to make remittances into bank accounts that are not payment card accounts.

FIG. 42 is a block diagram that illustrates a remittance system 4200 in which an international payment card system 4202 (akin to payment system 102, FIG. 1) is used to make a remittance into a bank account (recipient's account) 4204 that is not a payment card account. As the remittance system 4200 is illustrated in FIG. 42, only the system components that may be involved in a single remittance transaction are shown. Nevertheless, in practice, there may be a large number of additional system components, as will be described in further detail below.

The remittance system 4200 may include a personal computer 206 that is operated by a customer of an FI to initiate a remittance transaction. In particular, the personal computer 206 may be used to access a remittance services website 4206 hosted by, e.g., the computer 202 (FIG. 2) operated by or on behalf of the FI which issued the customer's payment card account from which the customer wishes to fund the remittance transaction. The personal computer 206 may access the remittance services website 4206 via a network 208 such as the Internet. The interaction of the customer (via the customer's PC 206) with the remittance services website 4206 may be via a user interface like that illustrated above in FIGS. 31, 34A and 38-41. For present purposes, it will be assumed that the customer has selected as the recipient's account for the remittance transaction a bank account that is located in a foreign country (foreign bank) and that is not a payment card account.

The remittance system 4200 may also include a server computer 4208 that handles remittance transaction requests forwarded from the remittance website 4206/FI computer 202. The remittance transaction requests initiated by FI customers may be sent from the FI computer to the remittance request handling server computer 4208 via a data communication network which may be the Internet 208 or which may be a separate (e.g., private) network, which is not separately shown. The remittance request handling server computer 4208 may be operated by or on behalf of the payment card association that operates the payment system network 4202.

The remittance request handling server computer 4208 is in communication with the payment system network 4202, via a payment system gateway computer 4210, for the purpose for initiating payment card system payment transactions to be routed via the payment system network 4202. Block 4212 in FIG. 42 represents both (a) an Agent Bank appointed by the payment card association in the country in which recipient's bank account is located, and (b) a computer operated by or on behalf of the Agent Bank. A settlement account 4214 is maintained by the Agent Bank to receive funds via payment transactions in the payment system network 4202 and to disburse the funds by suitable transfer mechanisms to the recipients' accounts. Thus the settlement account 4214 may serve in effect as the target payment card account for payment transactions routed by the payment system network 4202. The Agent Bank also receives (e.g., on a daily basis) a file 4216 of funds transfer instructions from remittance request handling server computer 4208.

In cases where the recipient's account 4204 is maintained (as depicted in FIG. 42) with a bank 4218 that is not the Agent Bank 4212, the remittance is completed with an interbank electronic funds transfer (EFT) 4220 from the settlement account 4214 into the recipient's account 4204. In the special case when the recipient's account is at the Agent Bank, the remittance is completed with an intrabank EFT 4222, which is indicated in phantom.

To consider more broadly the remittance system 4200, it should be understood that there may be many (potentially hundreds of thousands or millions) of user computers (beyond the one user computer 206 which is shown in FIG. 42) that may potentially participate in the remittance system, and in fact a considerable number of user computers may simultaneously access the remittance system 4200 for the purpose of initiating remittance transactions. There may be only one remittance website 4206, or alternatively, there may be a separate website for each country or region from which remittances may be sent through the system 4200 and/or a separate website for each sending FI. Similarly, there may be only one remittance request handling server computer 4208, or there may be a number of such computers, each serving a respective country or region and/or backing up another such computer. There may also be a number of payment system gateways 4210. Preferably, but not necessarily, the payment system network 4202 may be a single worldwide payment system such as the Banknet system operated by MasterCard International Inc., the assignee hereof.

Continuing to consider the remittance system 4200 from a broad point of view, there may be a respective Agent Bank 4212 and a respective settlement account 4214 in each country to which remittances may be sent via the system 4200. Moreover, there may be a considerable number of recipient banks 4218 in each country to which remittances may be sent via the system 4200. For example, the recipient banks may include every bank that participates in an EFT or ACH (automated clearing house) system with the Agent Bank in a given country.

Figure 43:
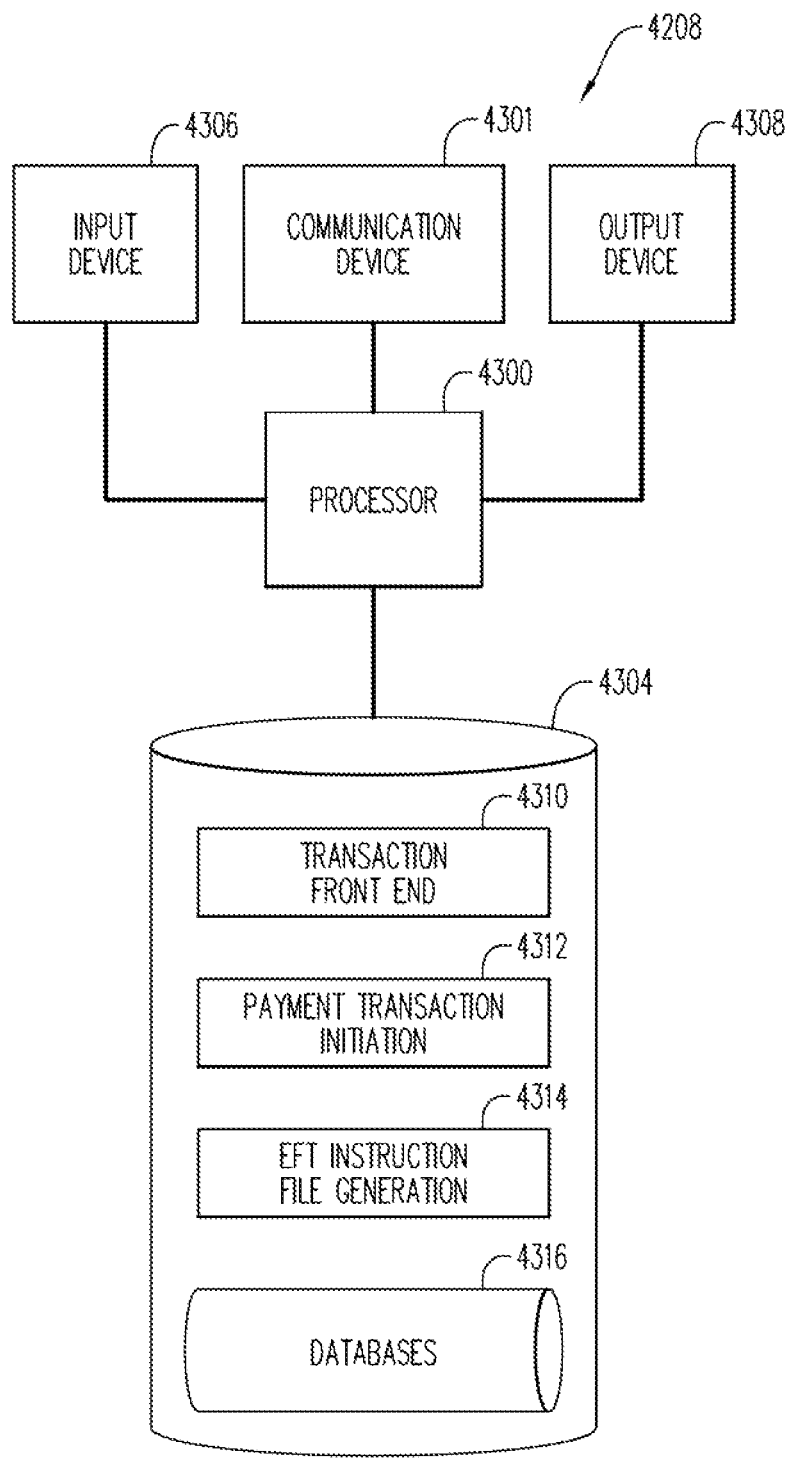
FIG. 43 is a block diagram that illustrates a server computer that is included in the system of FIG. 42 for initiating funds transfers.

FIG. 43 is a block diagram that illustrates an example embodiment of the remittance request handling server computer 4208 shown in FIG. 42.

In its hardware aspects, the remittance request handling server computer 4208 may be conventional, and similar to the hardware components described in connection with the computers described above with reference to FIGS. 3 and 4. The hardware aspects of the remittance request handling server computer 4208 will therefore not be further described, except to mention that the remittance request handling server computer 4208 may include a processor 4300 in communication with a communication device 4301, a storage device 4304, an input device 4306, and an output device 4308.

The storage device 4304 may store one or more application programs, represented by blocks 4310, 4312 and 4314, and that include software program instructions to control the processor 4300. For example, program 4310 may program the processor 4300 to handle incoming requests for remittance transactions received via the remittance website 4206 (FIG. 42). Program 4312 may program the processor 4300 to respond to remittance transaction requests by initiating payment transactions to be routed via the payment system network 4202 to the respective Agent Bank 4212 and settlement account 4214 in the country to which the remittance is to be sent. Program 4314 may program the processor 4300 to prepare and transmit files of instructions to the Agent Banks in the various countries to perform funds transfers to the recipients' accounts 4204. Further, one or more databases 4316 stored on the storage device 4304 may contain data relating to remittance transactions, instructions issued, etc. (Although the programs 4310, 4312 and 4314 are presented as separate applications, in practice any two or more of them may be combined into a single application.)

In addition to the software programs expressly listed above, the remittance request handling server computer 4208 may be programmed with other software, such as one or more operating systems, device drivers, database management programs, etc.

Figure 44:
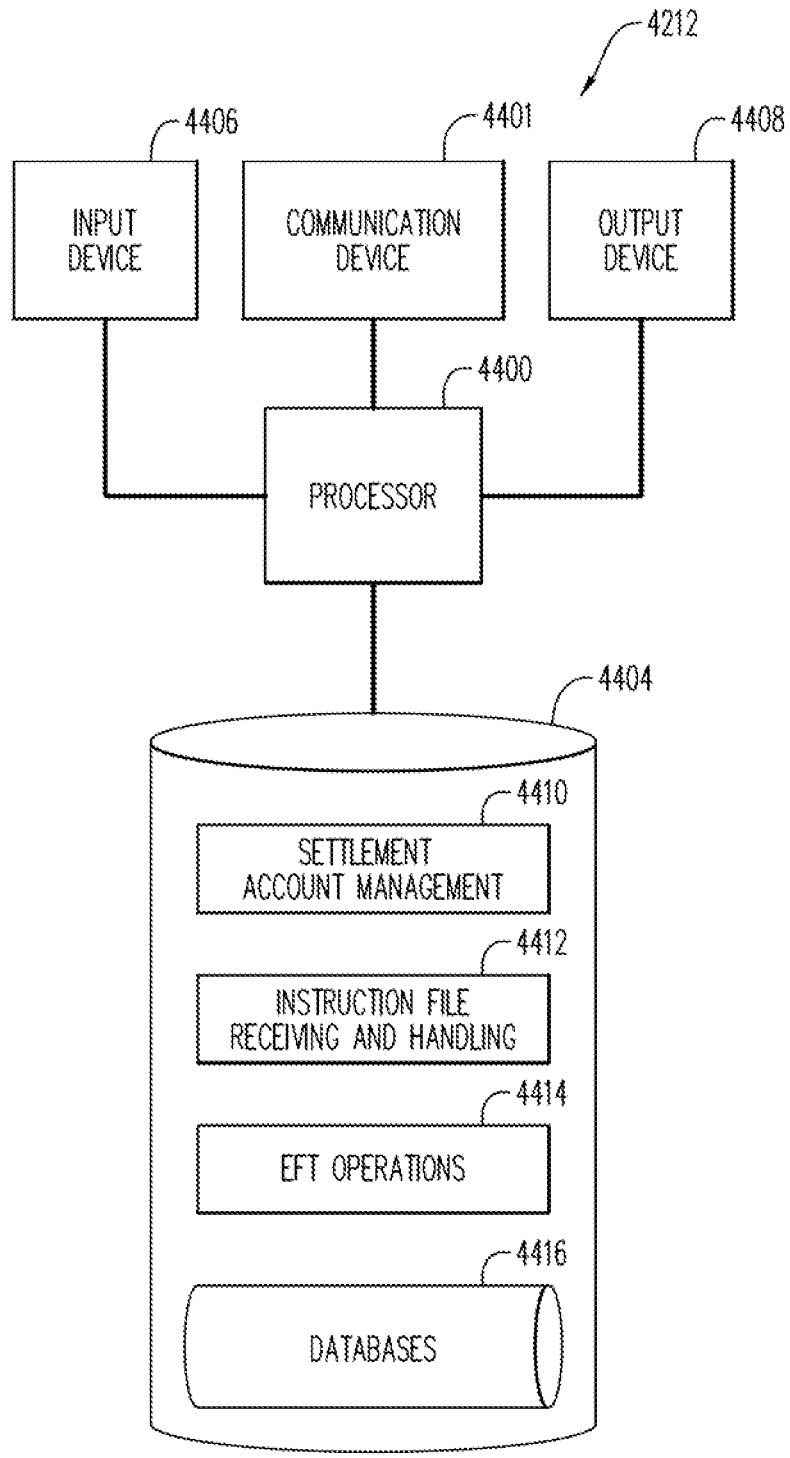
FIG. 44 is a block diagram that illustrates a computer that receives and/or relays funds transfers in the system of FIG. 42.

FIG. 44 is a block diagram that illustrates an example embodiment of the Agent Bank computer 4212.

In its hardware aspects, the Agent Bank computer 4212 may be conventional, and similar to the hardware components described in connection with the computers described above with reference to FIGS. 3, 4 and 43. The hardware aspects of the Agent Bank computer 4212 will therefore not be further described, except to mention that the Agent Bank computer 4212 may include a processor 4400 in communication with a communication device 4401, a storage device 4404, an input device 4406, and an output device 4408.

The storage device 4404 may store one or more application programs, represented by blocks 4410, 4412 and 4414, and that include software program instructions to control the processor 4400. For example, program 4410 may program the processor 4400 to manage the settlement account 4214 (FIG. 42), including responding to and receiving payment transactions routed to the settlement account 4214 via the payment system network 4202, and disbursement of funds from the settlement account 4214. Program 4412 may program the processor 4400 to receive and interpret funds transfer instruction files received from the remittance request handling server computer 4208. Program 4414 may program the processor 4400 to interact with an EFT network (not separately shown) to implement electronic funds transfer from the settlement account 4214 to the recipients' accounts (e.g., account 4204 shown in FIG. 42). Further, one or more databases 4416 stored on the storage device 4304 may contain data relating to transfers of funds into and out of the settlement account 4214. (Although the programs 4410, 4412 and 4414 are presented as separate applications, in practice any two or more of them may be combined into a single application.)

In addition to the software programs expressly listed above, the Agent Bank computer 4212 may be programmed with other software, such as one or more operating systems, device drivers, database management programs, etc.

Figure 45:
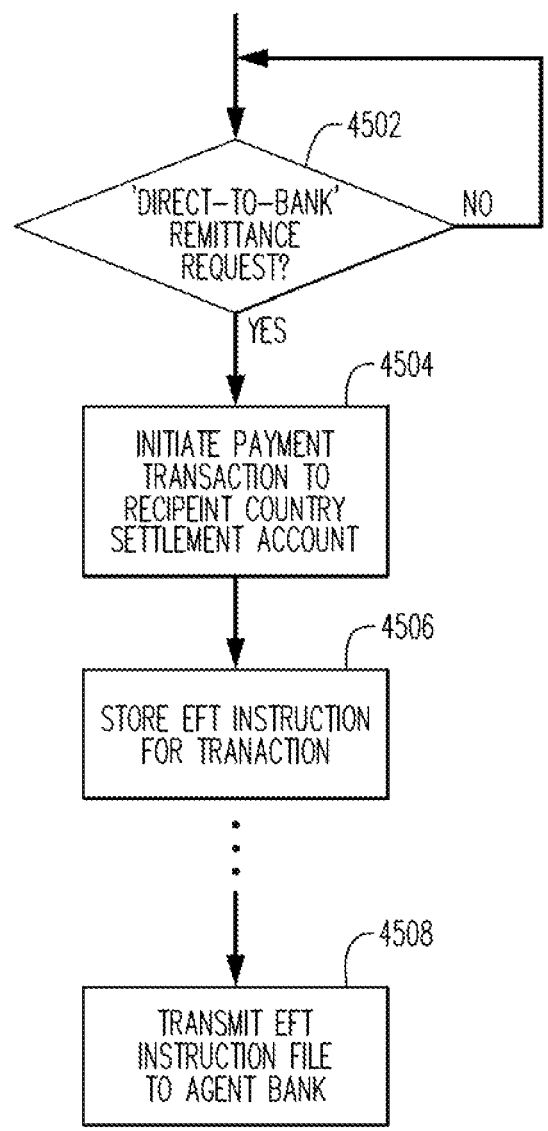
FIG. 45 is a flow chart that illustrates a process that may be performed by the computer of FIG. 43.

FIG. 45 is a flow chart that illustrates a process that may be performed by the remittance request handling server computer 4208

At 4502 in FIG. 45, the remittance request handling server computer 4208 determines whether a remittance request received via the remittance website 4206 is to be directed to a recipient's account which is not a payment card account. If so, then step 4504 follows 4502. (In the case where the recipient's account indicated in the remittance request is a payment card account, then the remittance request handling server computer 4208 may initiate a conventional payment card system payment transaction to be routed to the recipient's payment card account, as described in the above-mentioned, commonly assigned U.S. patent application Ser. No. 11/836, 984.)

At step 4504, the remittance request handling server computer 4208 initiates a payment transaction to be routed via the payment system network 4202 to the settlement account 4214 in the country in which the recipient's account 4204 is located. The payment transaction may be funded from the sender's payment card account designated in the remittance request. Any currency translation required in connection with the payment transaction may be performed in a conventional manner by the remittance request handling server computer 4208. At substantially the same time, and as indicated at 4506, the remittance request handling server computer 4208 stores an instruction to be sent later to the Agent Bank computer 4212 to instruct the Agent Bank computer 4212 to transfer the proceeds of the payment transaction initiated at 4504 from the settlement account 4214 to the recipient's account 4204. Thereafter, and as indicated at 4508, the instruction stored at 4506 is sent to the Agent Bank computer 4212 as part of a file 4224 (FIG. 42) of funds transfer instructions. For example, this may be done as part of an end-of-day batch process performed by the remittance request handling server computer 4208. In practice, the remittance request handling server computer 4208 may send such a funds transfer instruction file daily to the respective Agent Bank computer 4212 for each country to which the remittance request handling server computer 4208 sends remittances by the process illustrated in FIG. 42.

Figure 46:
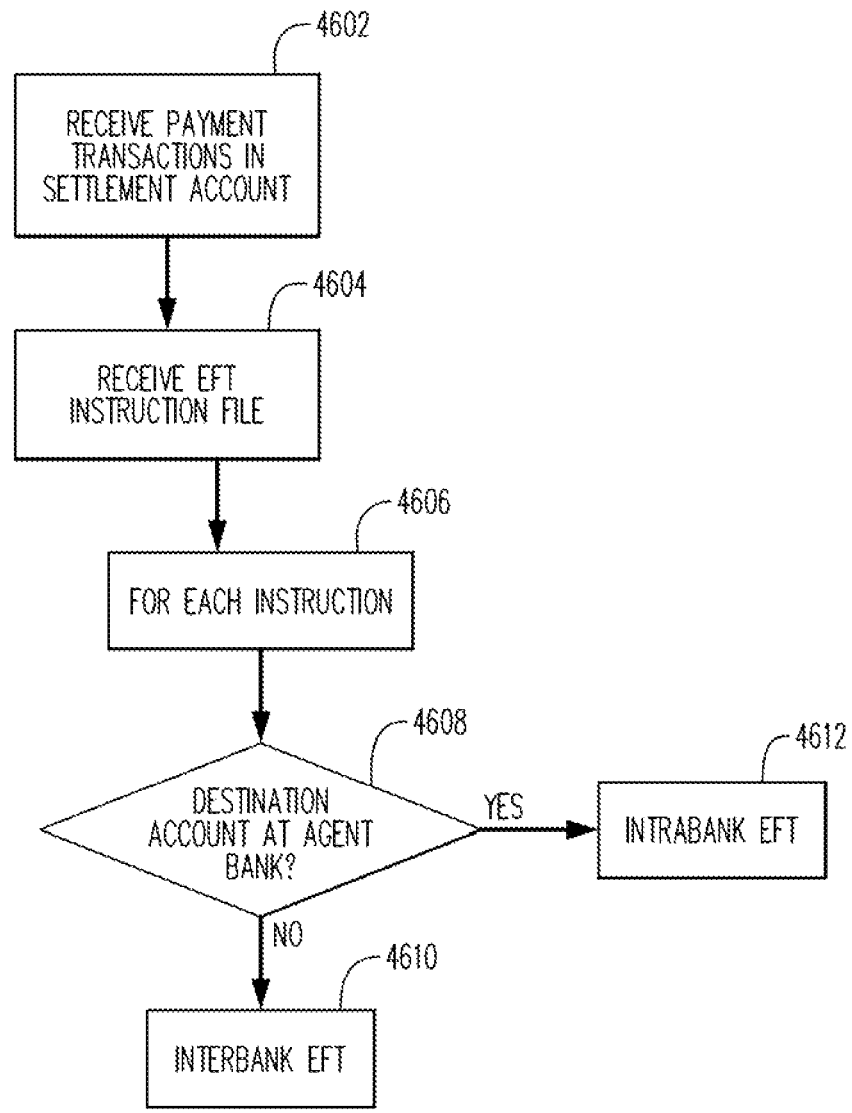
FIG. 46 is a flow chart that illustrates a process that may be performed by the computer of FIG. 44.

FIG. 46 is a flow chart that illustrates a process that may be performed by the Agent Bank computer 4212.

At 4602, the Agent Bank computer 4212 receives in the settlement account 4214 payment transactions routed to the settlement account 4214 by the remittance request handling server computer 4208 via the payment system network 4202. This may take place on an ongoing basis and may include sending of acknowledgement messages or the like in connection with the payment transactions, as would conventionally be performed by the issuer of the recipient's payment card account in the case of a conventional payment transaction.

At 4604, the Agent Bank computer 4212 receives from the remittance request handling server computer 4208 an instruction file 4224 (FIG. 42) that instructs the Agent Bank computer 4212 to execute funds transfers to disburse the funds received in the settlement account 4212 via the payment transactions received therein in step 4602. Then for each instruction (as indicated at 4606) in the instruction file 4224, the Agent Bank computer 4212 determines, at 4608, whether the recipient's bank account designated in the current instruction is at a bank different from the Agent Bank or is at the Agent Bank. If the recipient's bank account is at a different bank (bank 4218, FIG. 42), then as indicated at 4610, the Agent Bank computer 4212 executes an interbank EFT to transfer the proceeds of the remittance to the recipient's account 4204. (Alternatively, in at least some cases, the transfer to the recipient's bank 4218 may be via an ACH transaction.)

However, if the Agent Bank computer 4212 determines at 4608 that the recipient's bank account designated in the current instruction is at the Agent Bank, then as indicated at 4612, the Agent Bank computer 4212 executes an intrabank EFT to transfer the proceeds of the remittance to the recipient's account at the Agent Bank.

With the remittance process just described with reference to FIGS. 42-46, a recipient who does not have a payment card account may nonetheless receive remittances that utilize the highly efficient funds transfer capabilities of an international payment card system like that operated by the assignee hereof.

In some embodiments of the "direct-to-bank" remittance system depicted in FIG. 42, there may be, as noted above, a number of remittance request handling server computers 4208—one for each country or region in the system, for example. Although FIG. 42 suggests that each remittance request handling server computer 4208 separately sends an EFT instruction file 4224 to the respective Agent Bank computer 4212 in each other country, in practice at least some of the separate EFT instruction files 4224 directed to a given Agent Bank computer 4212 may be aggregated at a central processing facility (not shown) so that each Agent Bank computer 4212 may receive only one EFT instruction file 4224 rather than a separate EFT instruction file 4224 originating from each remittance request handling server computer 4208.

In the above discussion of FIGS. 42 and 45 it has been assumed that the source of funds for the "direct-to-bank" transfer was the sender's payment card account. Alternatively, however, the source of funds may be a bank account belonging to the sender that is not a payment card account. To accommodate this alternative, the remittance request handling server computer 4208 may be directly interfaced to an internet banking system (not shown) that is operated by the sender's bank.

Figure 47:
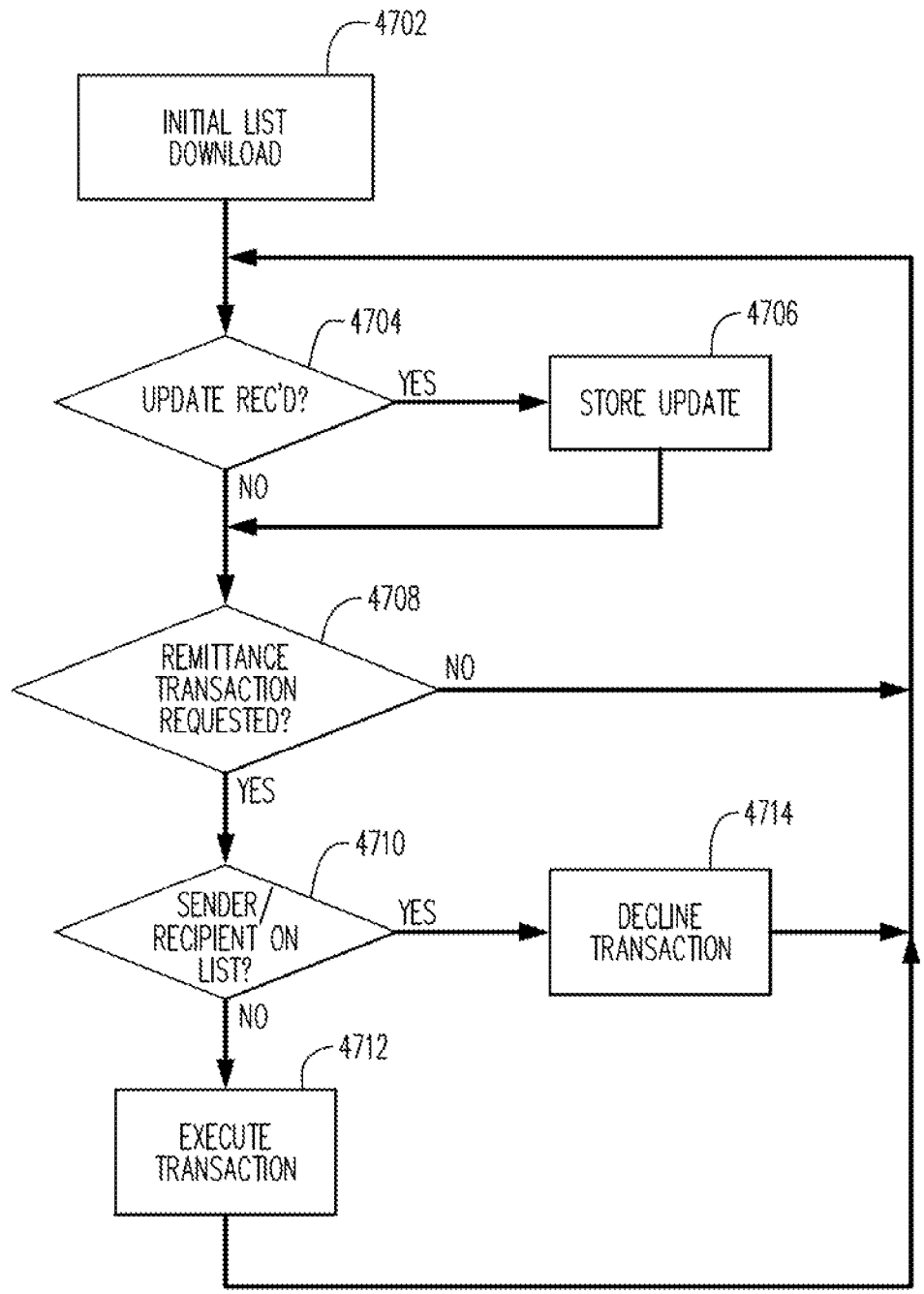
FIG. 47 is a flow chart that illustrates a process that may be performed by a financial institution computer in the system of FIGS. 1 and/or 2.

FIG. 47 is a flow chart that illustrates a process that may be performed by a financial institution computer 104 or 202 in the system of FIGS. 1 and/or 2.

At 4702 in FIG. 47, a list of individuals, including their names and possibly also their residence addresses, is downloaded to the financial institution computer 104 or 202. The list may have been developed by a law enforcement agency as a compilation of names of individuals who are believed to be actually or potentially involved in transfers of funds for illicit purposes, and thus who should be prevented from using banking facilities for such purposes. This list will hereinafter be referred to as a "suspect persons list".

At 4704, the financial institution computer 104 or 202 determines whether it has received data to update the suspect persons list. If so, the financial institution computer 104 or 202 updates the suspect persons list, as indicated at 4706. Following 4706, or directly following 4704 if no update is received, is decision block 4708. At 4708 it is determined whether the financial institution computer 104 or 202 has received a request to perform a remittance transaction. If not, then the process of FIG. 47 loops back to 4704.

It will be appreciated that if a request for a remittance transaction is determined at 4708 to have been received, then the request would originate from a sender who is a customer of the financial institution that operates the computer 104 or 202, and the request would also specify a recipient, presumably one who has previously been entered in the sender's remittance website user account (e.g., as per FIG. 36, as discussed above).

If a positive determination (i.e. remittance request received) is made at 4708, then decision block 4710 follows 4708. At 4710, the financial institution computer 104 or 202 accesses the suspect persons list (as currently updated) to determine whether either one of the sender or the recipient is currently listed on the suspect persons list. If not, then the financial institution computer 104 or 202 proceeds to execute the requested remittance transaction, as indicated at 4712 (assuming that the sender's account is in a condition to support the transaction and assuming that all else is in order). However, if either the sender or recipient is on the suspect persons list, then the financial institution computer 104 or 202 declines to perform the requested remittance transaction, as indicated at 4714. Following either 4712 or 4714, the process of FIG. 47 loops back to 4704.

As a result of the process of FIG. 47, for each requested remittance transaction, the financial institution computer 104 or 202 checks the suspect persons list for the presence of the sender's and the recipient's name on the list in real time after receiving the request for the transaction and before executing the remittance transaction. More specifically, the financial institution computer 104 or 202 may compare the sender and the recipient with the suspect persons list in real time with respect to each request for a remittance transaction (also referred to as "funds transfer requests"). In this way, the financial institution computer 104 or 202 may perform very effectively in excluding suspect persons from utilizing the remittance system. It will be appreciated that the financial institution computer 104 or 202 may loop through the process of FIG. 47 many times, executing step 4710 with respect to each one of numerous remittance requests.

In at least some of the screen displays presented in the appended drawings, there are button portions or regions, also referred to as "buttons". It should be understood that, in accordance with conventional practices, such buttons may be actuated by suitably operating a pointing device such as a mouse by positioning a cursor (not shown) on the button while clicking a button on the pointing device. Such an operation is sometimes referred to as "clicking" on the button region of the screen display. The pointing device may be one of the computer input devices shown in the various computer block diagrams included in the drawings, or may be a component of a user computer shown in the drawings. It will also be appreciated that entry of data may be accomplished by using a computer keyboard (also one of the computer input devices) after using a pointing device to position a cursor in the desired data entry fields among the data entry fields shown in the appended screen display drawings.

As used herein and in the appended claims, "displaying" a screen display includes downloading a webpage from a server computer for display on a client computer.

It is noted that "payment transaction" is a term of art in the field of payment card systems, and refers to a transaction in which—in contradistinction to a purchase transaction—funds flow from an acquirer to an issuer as a credit to a payment card account issued to the issuer. In this context, the sending FI may be considered to be an acquirer and the receiving FI may be considered to be an issuer.

As used herein and in the appended claims, a "service fee" includes a flat fee and/or a percentage-based fee and/or a combination thereof and/or a foreign exchange markup.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account or a deposit account that the account holder may access using a debit card. The term "payment card account number" includes a number that identifies a payment card account or a number carried by a payment card, or a number that is used to route a transaction in a payment system that handles debit card and/or credit card transactions. The term "payment card" includes a credit card or a debit card.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   displaying, via processor, a data entry page that includes:
   (a) a first column of data fields, said fields in said first column for displaying tier start currency amounts;
   (b) a second column of data fields, said fields in said second column for receiving numerical data entry and for displaying data in regard to tier end currency amounts; and
   (c) a third column of data fields, said fields in said third column for receiving numerical data entry and for displaying data in regard to tier fee level amounts;
   receiving numerical data entry indicative of a first tier end currency amount in a first one of said fields in said second column, said first one of said fields in said second column located in a first row of data fields; and
   in response to receiving said numerical data entry indicative of the first tier end currency amount, automatically populating a certain data field with said first tier end currency amount as a second tier start currency amount, said certain data field located in said first column and located in a second row of data fields, said second row immediately below said first row.

2. The method of claim 1, further comprising:
receiving numerical data entry indicative of a second tier end currency amount in a second one of said fields in said second column, said second one of said fields in said second column located in said second row of data fields; and
in response to receiving said numerical data entry indicative of the second tier end currency amount, automatically populating a second certain data field with said second tier end currency amount as a third tier start currency amount, said second certain data field located in said first column and located in a third row of data fields, said third row immediately below said second row.

3. The method of claim 2, further comprising:
receiving numerical data entry indicative of tier fee level amounts in said data fields of said third column.

4. The method of claim 3, further comprising:
storing a transaction fee profile based at least in part on said received numerical data entries.

5. The method of claim 3, further comprising:
storing a foreign exchange fee profile based at least in part on said received numerical data entries.

6. The method of claim 1, wherein said data entry page further includes:
(d) a fourth column of data fields, said fields in said fourth column for receiving numerical data entry and for displaying data in regard to tier percentage fee level amounts.

7. The method of claim 1, wherein the fee level amount is expressed as a percentage.

8. An apparatus comprising:
a processor;
a display device operatively coupled to the processor; and
a memory device in communication with the processor and storing program instructions, the processor operative with the program instructions to:
cause the display device to display a data entry page that includes:
(a) a first column of data fields, said fields in said first column for displaying tier start currency amounts;
(b) a second column of data fields, said fields in said second column for receiving numerical data entry and for displaying data in regard to tier end currency amounts; and
(c) a third column of data fields, said fields in said third column for receiving numerical data entry and for displaying data in regard to tier fee level amounts;
receive numerical data entry indicative of a first tier end currency amount in a first one of said fields in said second column, said first one of said fields in said second column located in a first row of data fields; and
in response to receiving said numerical data entry indicative of the first tier end currency amount, automatically populate a certain data field with said first tier end currency amount as a second tier start currency amount, said certain data field located in said first column and located in a second row of data fields, said second row immediately below said first row.

9. The apparatus of claim 8, wherein the processor is further operative with the program instructions to:
receive numerical data entry indicative of a second tier end currency amount in a second one of said fields in said second column, said second one of said fields in said second column located in said second row of data fields; and
in response to receiving said numerical data entry indicative of the second tier end currency amount, automatically populate a second certain data field with said second tier end currency amount as a third tier start currency amount, said second certain data field located in said first column and located in a third row of data fields, said third row immediately below said second row.

10. The apparatus of claim 9, wherein the processor is further operative with the program instructions to:
receive numerical data entry indicative of tier fee level amounts in said data fields of said third column.

11. The apparatus of claim 10, wherein the processor is further operative with the program instructions to:
store a transaction fee profile based at least in part on said received numerical data entries.

12. The apparatus of claim 10, wherein the processor is further operative with the program instructions to:
store a foreign exchange fee profile based at least in part on said received numerical data entries.

13. The apparatus of claim 8, wherein said data entry page further includes:
(d) a fourth column of data fields, said fields in said fourth column for receiving numerical data entry and for displaying data in regard to tier percentage fee level amounts.

14. The apparatus of claim 8, wherein the fee level amount is expressed as a percentage.

15. An article of manufacture comprising:
a computer readable medium having computer readable program code means embodied therein for permitting definition of fee profiles for remittance transactions, the computer readable program code means in said article of manufacture comprising:
computer readable program code means for displaying a data entry page that includes:
(a) a first column of data fields, said fields in said first column for displaying tier start currency amounts;
(b) a second column of data fields, said fields in said second column for receiving numerical data entry and for displaying data in regard to tier end currency amounts; and
(c) a third column of data fields, said fields in said third column for receiving numerical data entry and for displaying data in regard to tier fee level amounts;
computer readable program code means for receiving numerical data entry indicative of a first tier end currency amount in a first one of said fields in said second column, said first one of said fields in said second column located in a first row of data fields; and
computer readable program code means for, in response to receiving said numerical data entry indicative of the first tier end currency amount, automatically populating a certain data field with said first tier end currency amount as a second tier start currency amount, said certain data field located in said first column and located in a second row of data fields, said second row immediately below said first row.

16. The article of manufacture of claim 15, further comprising:
computer readable program code means for receiving numerical data entry indicative of a second tier end currency amount in a second one of said fields in said second column, said second one of said fields in said second column located in said second row of data fields; and
computer readable program code means for, in response to receiving said numerical data entry indicative of the second tier end currency amount, automatically populating a second certain data field with said second tier end currency amount as a third tier start currency amount, said second certain data field located in said first column and located in a third row of data fields, said third row immediately below said second row.

17. The article of manufacture of claim 16, further comprising:
computer readable program code means for receiving numerical data entry indicative of tier fee level amounts in said data fields of said third column.

18. The article of manufacture of claim 17, further comprising:
computer readable program code means for storing a transaction fee profile based at least in part on said received numerical data entries.

19. The article of manufacture of claim 17, further comprising:
computer readable program code means for storing a foreign exchange fee profile based at least in part on said received numerical data entries.

20. The article of manufacture of claim 15, wherein said data entry page further includes:
(d) a fourth column of data fields, said fields in said fourth column for receiving numerical data entry and for displaying data in regard to tier percentage fee level amounts.

21. The article of manufacture of claim 15, wherein the fee level amount is expressed as a percentage.

* * * * *